United States Patent [19]

Fujii et al.

[11] Patent Number: 5,131,043
[45] Date of Patent: Jul. 14, 1992

[54] METHOD OF AND APPARATUS FOR SPEECH RECOGNITION WHEREIN DECISIONS ARE MADE BASED ON PHONEMES

[75] Inventors: Satoru Fujii; Katsuyuki Niyada, both of Sagamihara, Japan

[73] Assignee: Matsushita Electric Industrial Co., Ltd., Osaka, Japan

[21] Appl. No.: 441,225

[22] Filed: Nov. 20, 1989

Related U.S. Application Data

[63] Continuation of Ser. No. 647,186, Sep. 4, 1984, abandoned.

[30] Foreign Application Priority Data

Sep. 5, 1983 [JP] Japan .................................. 58-163537
Jul. 27, 1984 [JP] Japan .................................. 59-157813
Aug. 16, 1984 [JP] Japan .................................. 59-170659

[51] Int. Cl.⁵ .............................................. G10L 5/04
[52] U.S. Cl. ........................................ 381/41; 381/43
[58] Field of Search ................................ 381/41-43; 364/513, 513.5

[56] References Cited

U.S. PATENT DOCUMENTS

| | | | |
|---|---|---|---|
| 4,038,503 | 7/1977 | Moshier | 381/43 |
| 4,092,493 | 5/1978 | Rabines et al. | 381/43 |
| 4,394,538 | 7/1983 | Warren et al. | |
| 4,400,828 | 8/1983 | Pirz et al. | 381/43 |
| 4,412,098 | 10/1983 | An | 381/43 |
| 4,446,531 | 5/1984 | Tanaka | 364/513.5 |
| 4,467,437 | 8/1984 | Tsuruta et al. | |
| 4,489,434 | 12/1984 | Moshier | 381/43 |
| 4,513,436 | 4/1985 | Nose et al. | 381/43 |
| 4,555,796 | 11/1985 | Sakoe | |
| 4,571,697 | 2/1986 | Watanabe | 381/43 |
| 4,590,605 | 5/1986 | Hataoka et al. | 381/43 |
| 4,592,085 | 5/1986 | Watari et al. | 381/43 |
| 4,592,086 | 5/1986 | Watari et al. | |
| 4,601,054 | 7/1986 | Watari et al. | 381/43 |
| 4,618,984 | 10/1986 | Das et al. | 381/43 |
| 4,624,010 | 12/1986 | Takebayashi | 381/41 |
| 4,624,011 | 11/1986 | Watanabe et al. | 381/43 |
| 4,625,287 | 11/1986 | Matsuura et al. | 381/43 |
| 4,761,815 | 8/1988 | Hitchcock | 381/43 |
| 4,792,976 | 12/1988 | Watari | 381/43 |

Primary Examiner—Dale M. Shaw
Assistant Examiner—David D. Knepper
Attorney, Agent, or Firm—Lowe, Price, LeBlanc & Becker

[57] ABSTRACT

Linear prediction coefficients of a speech signal including unknown words are derived for each of successive periodic frame intervals. For every frame over the duration of an individual phoneme of the speech signal, the degree of similarity of stored coefficients of known words and derived coefficients of the unknown words are calculated so that at the end of the individual phonemes, the degree of similarity is calculated. Phoneme segmentation data are derived in response to the speech signal and combined with the calculated degree of similarity over the individual phoneme to derive phoneme strings of the speech signal. The derived and stored phoneme strings are compared to indicate the words stored in a word dictionary having the greatest similarity with the derived phoneme strings.

7 Claims, 11 Drawing Sheets

METHOD OF AND APPARATUS FOR SPEECH RECOGNITION WHEREIN DECISIONS ARE MADE BASED ON PHONEMES

This application is a continuation of application Ser. No. 06/647,186, filed Sep. 4, 1984, now abandoned.

BACKGROUND OF THE INVENTION

This invention relates generally to speech recognition apparatus and method, and more particularly to a speech apparatus and method using phoneme recognition.

Apparatus for and methods of speech recognition wherein spoken words are automatically recognized are extremely useful for supplying computers and other devices with data and instructions. In the prior art, pattern-matching is frequently used for word recognition. According to the pattern-matching method, there are prepared and prestored in a memory various standard patterns for all words to be recognized. The degree of similarity between an input unknown pattern and the standard patterns is computed to determine the input pattern data having the greatest similarity to the stored pattern. In this pattern-matching method, it is necessary to prepare standard patterns for all words to be recognized. Hence, new standard patterns must be supplied and stored by the apparatus when the apparatus is to recognize the words spoken by different people. If several hundred words are to be recognized, time-consuming and troublesome operations are performed to register all these words spoken by each speaker. Furthermore, a memory used for storing such spoken words is required to have an extremely large capacity. Moreover, when this method is used for a large number of words, a long time period is required to match an input pattern and the standard patterns.

Another method of obtaining the similarity between words prestored in a word dictionary uses phonemes. Input sounds are recognized as a combination of phonemes. In phoneme matching, the capacity of the memory used as the word dictionary is small, the time required for pattern matching comparison is short, and the contents of the word dictionary can be readily changed. For instance, since the sound "AKAI" can be expressed by way of a simple form of "a k a i" with three different phonemes /a/, /k/ and /i/ being combined, a number of spoken words emitted from unspecific speakers is easily handled.

In speech recognition for unspecific speakers, the characteristics of sounds drastically change depending on sex distinction and age difference. A problem with prior art phoneme devices is how to generalize various sound characteristics so as to recognize words spoken by unspecific persons.

In the case of recognition with a phoneme unit, phoneme standard patterns are subjected to a large dispersion due to sex distinction and age difference; for instance, in the case of a vowel /a/, there is a great difference in the shape of spectrum patterns in a spectrum diagram between male and female speakers.

In prior art devices this problem is solved by preparing plural standard patterns for each phoneme; each pattern corresponds to the phoneme for plural speakers. A calculation is performed for all the standard patterns and an input sound to determine which standard pattern is most similar to the input sound. However, this conventional technique suffers from the following drawbacks:

(1) The speech recognition must be expensive to perform high speed calculations for a large number of similarity calculations.

(2) Recognition rate is somewhat low since similarity is calculated by finding a phoneme having the greatest similarity to all the standard patterns; the number of similar phonemes is large, therefore, causing increased confusion between phonemes.

(3) The recognition rate is very low if a speaker utters sounds which do not correspond to any of the prepared standard patterns.

SUMMARY OF THE INVENTION

The present invention has been developed to remove the above-described drawbacks of conventional speech recognition apparatus.

It is, therefore, an object of the present invention to provide a new and improved speech recognition apparatus which is capable of handling words spoken by unspecific speakers, wherein the apparatus is not adversely influenced by changes in the speakers or acoustic environment so that high recognition rate is obtained in a stable manner.

Another object of the present invention is to provide a speech recognition apparatus which is capable of selecting a most suitable standard pattern group using unknown input sounds so that there is a high word recognition rate from unspecific speakers wherein the number of similarity calculations is remarkable reduced, leading to fast processing.

A further object of the present invention is to provide speech recognition apparatus capable of recognizing sounds from unspecific speakers with high recognition rate even if utterances from a speaker are not in prepared standard patterns.

According to a feature of the present invention, standard patterns are divided into several groups, one of which is automatically selected by analyzing some spoken words. Then the standard patterns of a selected group are automatically corrected.

In accordance with the present invention, a method of recognizing speech comprises: performing a linear prediction analysis of plural phonemes including the vowels and a nasal sound to calculate $p^{th}$ order LPC cepstrum coefficients in response to periodic frames derived for plural word utterances by plural speakers. In response to the calculated LPC cepstrum coefficients there is calculated a covariance matrix W that is a function of all the phonemes and a mean value $m_i$ for each of the particular phonemes, where i represents the particular phoneme. A weighting coefficient is derived in accordance with $$a_{ij} = 2 \sum_{j'=1}^{p} \delta^{jj'} m_{ij'}$$

where
$j = 1, 2 \ldots p$
$\delta^{jj'}$ = value of element jj' of inverse matrix $W^{-1}$ of covariance matrix W.

The values $a_{ij}$, $\delta^{jj'}$, $m_{ij'}$, and $m_i{}^t W^{-1} m_i$ for each of said phonemes are derived as coefficient values for the phonemes. In response to known phoneme sounds being uttered by a speaker, the value of an LPC cepstrum coefficient for each phoneme is derived. These LPC cepstrum coefficients are stored with the previously stored coefficient values of the corresponding phonemes to derive standard patterns for the phonemes. During a recognition mode while replicas of unknown words including the phonemes are derived: (i) phoneme segmentation of each unknown word is performed and (ii) for each segmented phoneme the similarity of LPC cepstrum coefficients of each segmented phoneme of the unknown words with the stored coefficient values of the standard patterns for the phonemes is determined in accordance with $$L_i = \sum_{j=1}^{P} a_{ij} x_j - m_i^t w^{-1} m_i$$

where t is a matrix transportation factor.

The standard phoneme most similar to the uttered phoneme is selected in response to the value of $L_i$. The selected standard phonemes are combined to form a phoneme string for an uttered word. The formed phoneme string for an uttered word is compared with stored phoneme strings for known words to determine which of the known words is the uttered word.

In a preferred embodiment, the plural speakers are divided into plural groups each including multiple speakers and the mean value of the LPC cepstrum coefficients for each phoneme of each group is calculated. From the calculated mean values the inverse matrix for each group is calculated. A weighting coefficient is calculated as $$a_{ij}^{(n)} = 2 \sum_{j=1}^{P} \delta^{ij} m_{ij}^{(n)}$$

for the $j^{th}$ order of each phoneme (i) of each group (n), where $\delta^{ij}$ is the value of element j, j' of inverse matrix $W^{-1}$ of covariance matrix W. An average distance of each phoneme i of each group (n) is calculated as $$d_i^{(n)} = m_i^{(n)t} W^{-1(n)} m_i^{(n)}.$$

The values of $a_{ij}^{(n)}$ and $d_i^{(n)}$ are stored for each group.

One of the groups prior to the recognition mode is selected by performing for each stored group a similarity calculation with a known uttered word in accordance with $$l_i^{(n)} = \sum_{j=1}^{P} a_{ij}^{(n)} C_j - d_i^{(n)}.$$

A center frame of each phoneme of each uttered unknown word is determined. The sum $L^{(n)}$ of center frame similarity $l_i^{(n)}$ for each phoneme of group n is calculated as $$L^{(n)} = \sum_{n=1}^{N} \sum_{i=1}^{K} l_i^{(n)}$$

where K = number of stored phonemes and N = number of center frames in group n.

The values of $L^{(n)}$ for the different groups are compared to select the group to which the speaker of the unknown uttered word is a member. During the recognition step the cepstrum PLC coefficients of the speaker of the unknown uttered words are compared only with the cepstrum LPC coefficients of the selected group.

In one embodiment, the center frame of each phoneme is selected from the frame in the center of each phoneme. In another embodiment, the center frame of each phoneme is selected from the frame having the greatest similarity.

In a further embodiment, the plural speakers are divided into plural groups each including multiple speakers. In this case, the mean value of the LPC cepstrum coefficients for each phoneme of each group is calculated. From the calculated mean values of all of groups n, a covariance matrix R common to all of the uttered known phonemes of the n groups is calculated. A weighting coefficient with respect to the $j^{th}$ order of the LPC cepstrum coefficients for each phoneme i of group n is derived as $$a_{ij}^{(n)} = 2 \sum_{j=1}^{P} v_{jj'} m_{ij}^{(n)}$$

where jj' is the value of element j, j' of inverse matrix $R^{-1}$ of covariance matrix R. An average distance to phoneme i of group n is derived as $$d_i^{(n)} = m_i^{(n)t} R^{-1} m_i^{(n)}$$

where t is a matrix transpose.

The values of $a_{ij}^{(n)}$ and $d_i^{(n)}$ for each of the n groups are stored as are the values of $a_{ij}^{(n)}$ and $d_i^{(n)}$ for each group. One of the groups is selected prior to the recognition mode by performing for each stored group is similarity calculation with a known uttered word in accordance with $$l_i^{(n)} = \sum_{j=1}^{P} a_{ij}^{(n)} C_j - d_i^{(n)}.$$

A center frame of each phoneme of each uttered unknown word is determined. The sum $L^{(n)}$ of center frame similarity $l_i^{(n)}$ for each phoneme of group n is calculated as $$L^{(n)} = \sum_{i=1}^{N} l_i^{(n)},$$

where N = number of center frames in group n.

The two groups having the largest value L are selected whereby the groups r and s having the largest and next largest values of L respectively have values of $L^{(r)}$ and $L^{(s)}$. A numerical indication of the relative values of $L^{(r)}$ and $L^{(s)}$ is derived. In response to the numerical indication having values in first and second ranges, groups r and s are respectively selected. During the recognition step the cepstrum PLC coefficients of the speaker of the unknown uttered words are compared only with the cepstrum LPC coefficients of the selected group.

In one embodiment the numerical indication is derived as $$R_e = L^{(r)} - L^{(s)}.$$

Group r is selected in response to $R_e$ being positive and in excess of a predetermined value. Group s is selected in response to $R_e$ being negative and in excess of the predetermined value. Groups r and s for LPC cepstrum coefficient similarity are selected in response to $R_e$ being less in absolute value than the threshold.

BRIEF DESCRIPTION OF THE DRAWINGS

The objects and features of the present invention will become more readily apparent from the following detailed description of the preferred embodiments taken in conjunction with the accompanying drawings in which.

The same or corresponding elements and parts are designated as like reference numerals throughout the drawings.

DETAILED DESCRIPTION OF THE INVENTION

Figure 1:
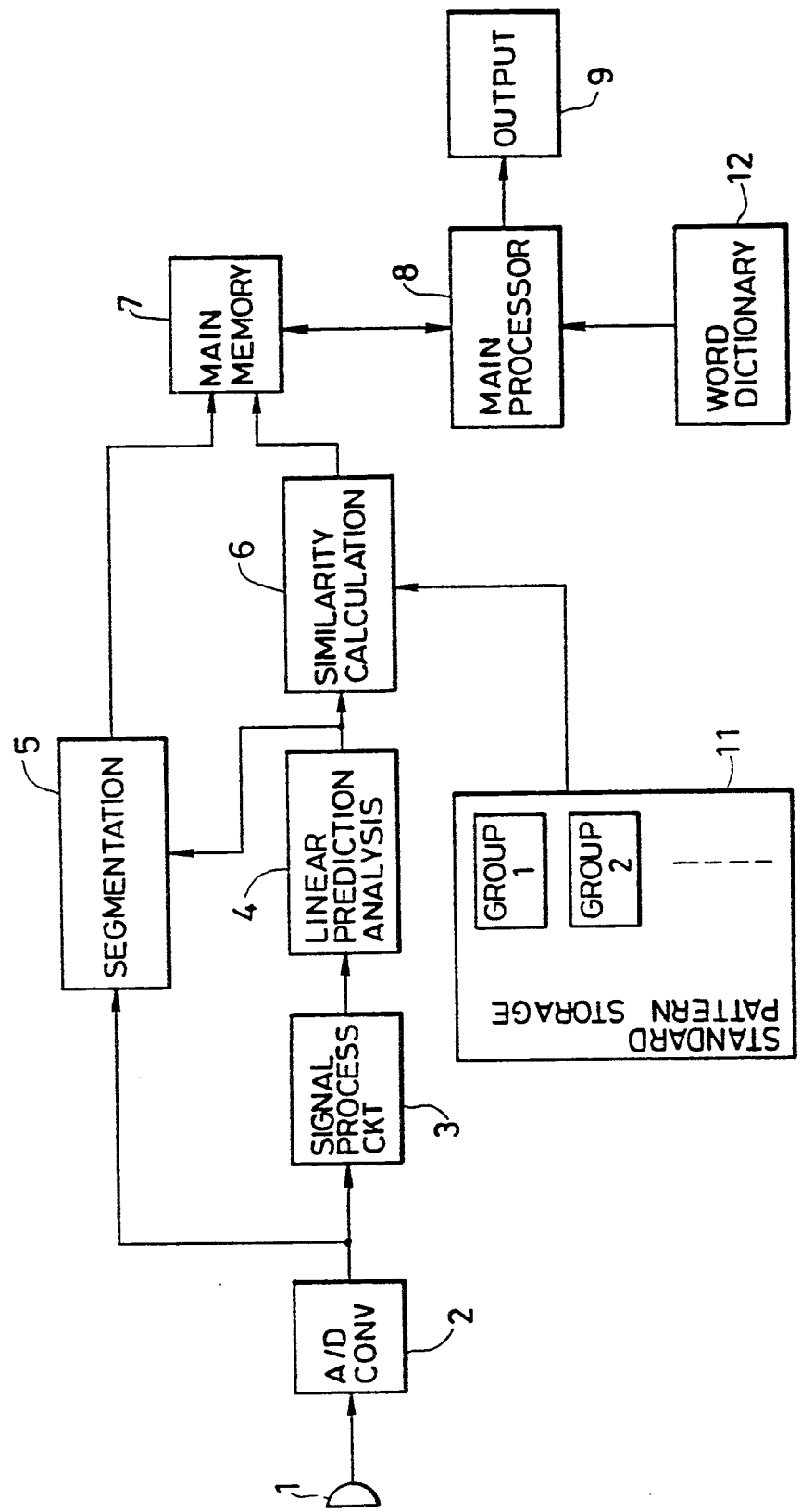
FIG. 1 is a block diagram of a conventional speech recognition apparatus of the phoneme recognition type.

Prior to describing the embodiments of the present invention and to provide a better understanding thereof, an example of a conventional phoneme recognition type speech recognition apparatus is described with reference to FIG. 1.

A standard pattern storage 11 stores groups of phoneme or syllable standard patterns. The standard patterns are produced by dividing sound data from plural speakers by a cluster analysis or the like. For simplicity of description, it is assumed that standard pattern group 1 includes male data, while standard pattern group 2 includes female data, such that six standard patterns are provided for each group.

A speech signal transduced by microphone 1 is A/D converted by A/D converter 2; the A/D converted data are fed to signal processing circuit 3 and to segmentation portion 5. In signal processing circuit 3, necessary pre-emphasis is performed and window calculation is executed; and the result of the calculation is fed to linear prediction analysis processor 4. In segmentation portion 5, the A/D converted data are band pass filtered, calculations are performed thereon, sound periods are detected, voiced and unvoiced features are determined and consonants are segmented. The results of these operations are transmitted from portion 5 to main memory 7 where they are stored. Similarity calculating portion 6 calculates the degree of similarity between standard patterns for groups 1, 2 etc. stored in memory 11 and LPC parameters derived by linear prediction analysis processor 4. Standard patterns of standard pattern group 1 stored in the memory 11 are transmitted to the similarity calculating portion 6 so that similarity calculation is executed for respective frames; the similarity calculation results are stored in main memory 7. The similarity calculation is then performed between the standard patterns of group 2 and the LPC parameters. Main processor 8 determines the phoneme or syllable in memory 7 having the greatest similarity to a phoneme or syllable in memory 11. From the determined greatest similarity and the result from segmentation portion 5, processor 8 then produces a phoneme or syllable string. Then the produced string is compared with the contents of word dictionary 12 to derive a recognized word that is fed to output portion 9.

As described at the beginning of the specification, in this conventional technique, the number of standard patterns to be prepared in advance is large, leading to a low recognition rate; this prior art method and apparatus requires an extremely large amount of calculation.

Figure 2:
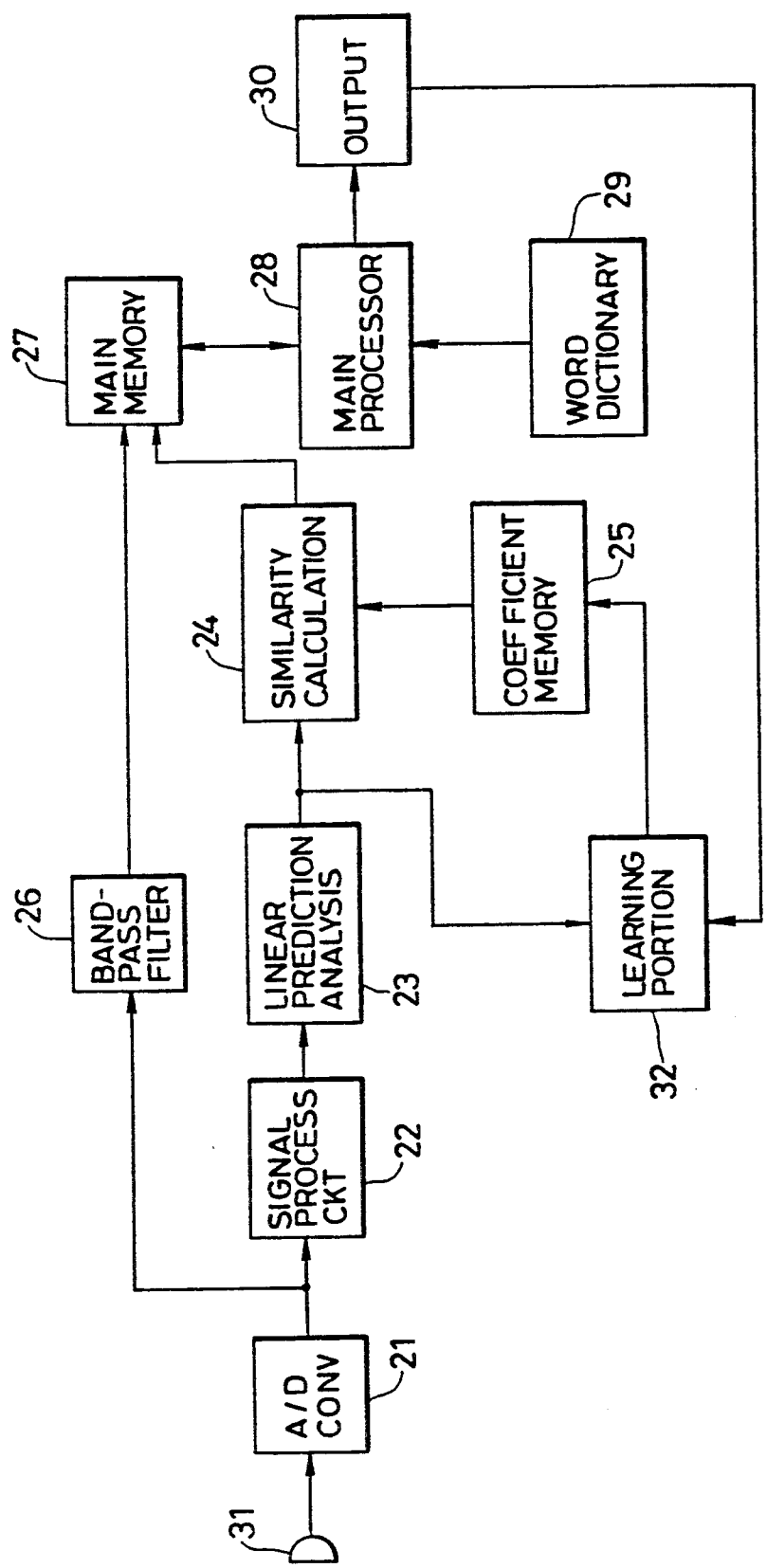
FIG. 2 is a schematic block diagram of a first embodiment of the speech recognition apparatus according to the present invention.

Reference is now made to FIG. 2, a schematic functional block diagram of a first embodiment according to the present invention. A sound or speech signal transduced by microphone 31 is A/D converted by A/D converter 21 into 12-bit digital data using 12 KHz sampling pulses. The digital data from A/D converter 21 are subjected to pre-emphasis and a Humming window of 20 msec in signal processing circuit 22, and then a linear prediction analysis processor 23 calculates LPC cepstrum coefficients every 10 msec. The LPC cepstrum coefficients obtained by the linear prediction analysis processor 23 are fed to a similarity calculation portion 24 where the degree of similarity to respective phonemes is calculated for every frame; the results of the similarity calculations are stored in main memory 27. Coefficient memory 25 stores for respective phonemes weighting coefficients that are compared in calculator portion 24 with the LPC cepstrum coefficients derived from processor 23.

Band-pass filter 26 responds to digital data from A/D converter 21 to calculate band level of three or more channels and overall range power level; the data derived by filter 26 are stored in main memory 27 as segmentation data. Main processor 28 detects sound periods and segments each phoneme in response to data fed from similarity calculating portion 24 and band-pass filter 26 to main memory 27. Processor 28 responds to data read out of memory 27 to derive a phoneme string by determining the phoneme derived from processor 23 having the greatest similarity in LPC cepstrum coefficient during every phoneme period with the LPC cepstrum coefficients stored in memory 25. The duration of the phoneme period is determined by processor 28 in response to the output of filter 26, as stored in memory 27. The degree of LPC coefficient similarity for each is determined by processor 28 by comparing the signals stored in memory 27 resulting from the outputs of similarity calculating portion 24. The phoneme string produced by the main processor 28 is then compared with words stored in word dictionary memory 29 where words are expressed in terms of phoneme strings. As a result of the comparison, the word in dictionary 29 having the greatest similarity with the phoneme string derived by main processor 28 is determined and fed to output portion 30.

Although it is possible to recognize words spoken by unspecific persons with only the above-described structure, since the contents of the coefficient memory 25 corresponding to the standard pattern are fixed, apparatus having only the above-described structure is apt to suffer from a low recognition rate. To solve this problem and in accordance with the invention, therefore, learning portion 32 is provided. Learning portion 32 produces learning data in response to LPC cepstrum coefficients derived from linear prediction analysis portion 23 and the recognition result derived from output portion 30, i.e. the word in dictionary 29 recognized by processor 28 as being closest to the phoneme string calculated by the processor in response to the output of memory 27. More specifically, learning portion 32 calculates discriminating coefficients for each phoneme, which is most suitable for a present speaker on the basis of variance and covariance obtained in advance, and feeds the calculated weighting coefficients to coefficient memory 25.

The operation of the speech recognition apparatus according to the present invention is further described in detail wit reference to FIG. 2. Prior to performing speech recognition some data are prepared as follows: A number of words spoken by a number of speakers are transduced by microphone 31 so that vowels /a/, /o/, /u/, /i/, /e/ and a nasal sound are derived from A/D converter 21. Then a linear prediction analysis is performed every 10 msec by linear prediction analysis processor 23 using obtained sound data to calculate $p^{th}$ order LPC cepstrum coefficients. Using the LPC cepstrum coefficients, a covariance matrix W that is a function of all the phonemes and a mean value $m_i$ for each phoneme (where i represents the phoneme type) are derived by processor 23. With this result, a weighting coefficient $a_{ij}$ (j=1, 2, ..., p) is derived as:

$$a_{ij} = 2 \sum_{j=1}^{p} \delta^{jj'} m_{ij'} \quad (2)$$

where element (j, j') of inverse matrix $W^{-1}$ of covariance matrix W is expressed by $\delta^{jj'}$.

Then the values of $a_{ij}$, $m_{ij'}$, $\delta^{jj'}$, $m_i{}^t W^{-1} m_i$, described infra, are derived for each phoneme as standard patterns to be stored in coefficient memory 25.

Then in response to a speaker uttering known sounds such as /a/, /i/, /u/, /e/, /o/, during a learning mode, LPC cepstrum coefficients are derived by linear prediction analysis processor 23 for the known sounds. Signals representing the LPC cepstrum coefficients as derived from processor 23 are fed to learning portion 32 which controls loading of memory 25. On the other hand, during a recognition mode, similarity calculating portion 24 determines the similarity of the LPC cepstrum coefficients derived from processor 23 with standard patterns prestored in coefficient memory 25. Similarity calculating portion 24 determines the similarity between the output of processor 23 and signals stored in memory 25 as a function of Mahalanobis' distance $D_i^2$, which is expressed as:

$$D_i^2 = x^t W^{-1} x - \sum_{j=1}^{p} a_{ij} x_j + m_i{}^t W^{-1} m_i \quad (3)$$

wherein
t represents transposition matrix; and
x represents the LPC cepstrum coefficients of the input signal as derived from processor 23.

Since a first term is constant with respect to phoneme i, similarity $L_i$ may be simply expressed by:

$$L_i = \sum_{j=1}^{p} a_{ij} x_j - m_i{}^t W^{-1} m_i \quad (4)$$

Therefore, similarity can be calculated using Formula (4); a signal representing the calculation result is fed to main memory 27, and a phoneme string is produced by main processor 28. Next, a value for a phoneme position to be earned, on a time base, is fed back from output portion 30 to learning portion 32 to derive the mean value of the LPC cepstrum coefficients of the phoneme to be learned. The above steps are repeated as many times as required for different types of sounds required to be recognized by the machine. Mean values of respective phonemes, to which suitable weights are given, are added to the original mean values ($m_{ij'}$) that are derived without learning. The resulting sums represent new mean values for respective phonemes so that the mean values $m_{ij'}$ in the coefficient memory 25, are replaced with new mean values. Furthermore, the weighting coefficients $a_{ij}$ and constant term (second term) of Formula (4) are corrected for each phoneme using these mean values. Then the corrected values are fed to the coefficient memory 25 as standard patterns to be rewritten as standard patterns.

The process for recognizing input speech with the arrangement of FIG. 2 is now described. An unknown sound signal transduced by microphone 31 is A/D converted first, and then LPC cepstrum coefficients x ($x_1, x_2, \ldots, x_p$) are derived from signal processing circuit 22 and linear prediction analysis processor 23. The LPC cepstrum coefficients are then fed to similarity calculating portion 24 where the similarity $L_i$ of phoneme i is obtained on the basis of formula (4) by comparing the standard patterns obtained in advance and stored in coefficient memory 25.

Similarity is obtained by portion 24 for respective phonemes (i=i, 2, ..., n; where n is the number of phonemes), and is fed to main memory 27. Main processor 28 recognizes phonemes and produces a phoneme string by combining the similarity data derived from calculator 24 and the segmentation result derived from band-pass filter 26.

Finally, the phoneme string signal derived by processor 28 is compared with signals stored in word dictionary 29 and processor 28 derives an output word that is the most similar to the word stored in memory 29; the finally determined word is fed to output portion 30.

The invention is not limited to storing known sounds prior to speech recognition so that the standard patterns in coefficient memory 25 are corrected in accordance with the results of known sound recognition. Instead, the standard patterns may also be corrected by recognizing unknown sounds during speech recognition. In this case, there is no need to learn known sounds prior to speech recognition. The alternative approach permits automatic adjustments for changes in acoustic environment and utterances of speakers.

As described supra, the speech recognition apparatus of the present invention enables standard patterns of respective phonemes to be matched with those of a speaker via a learning function, thereby providing a high recognition rate in a simple manner. Calculations for achieving learning are extremely simple, and therefore new standard patterns can be readily produced without requiring a high-accuracy, high-speed calculator.

Figure 3:
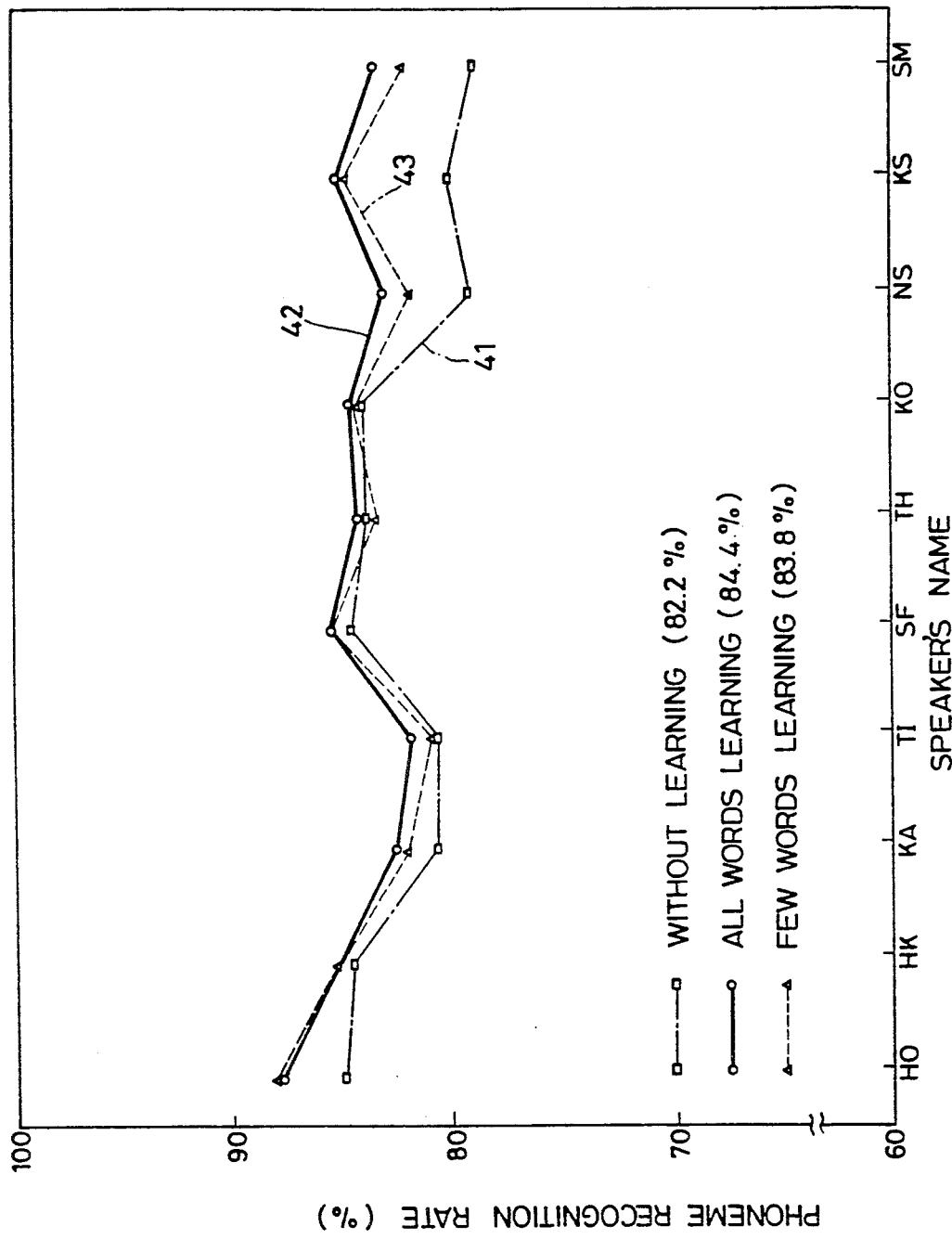
FIG. 3 is an explanatory graph of recognition rate for different speakers, obtained according to the present invention.

FIG. 3 is a graph of phoneme recognition rate of the FIG. 2 system, obtained with learning and without learning when words are spoken by ten adult men whose initials are shown along the X axis. Curve 42 is obtained when all words prepared for evaluation are spoken while a curve 43 is obtained when a relatively small number of words, such as twenty, are spoken; curves 42 and 43 are both obtained with learning. Curve 41 is obtained when learning is not used. A comparison between curves 41, 42, and 43 reveals that the speech recognition rate is improved with the learning function. The recognition rate for speakers NS, KS, SM et al whose recognition rate is low without learning is now remarkable improved.

Figure 4:
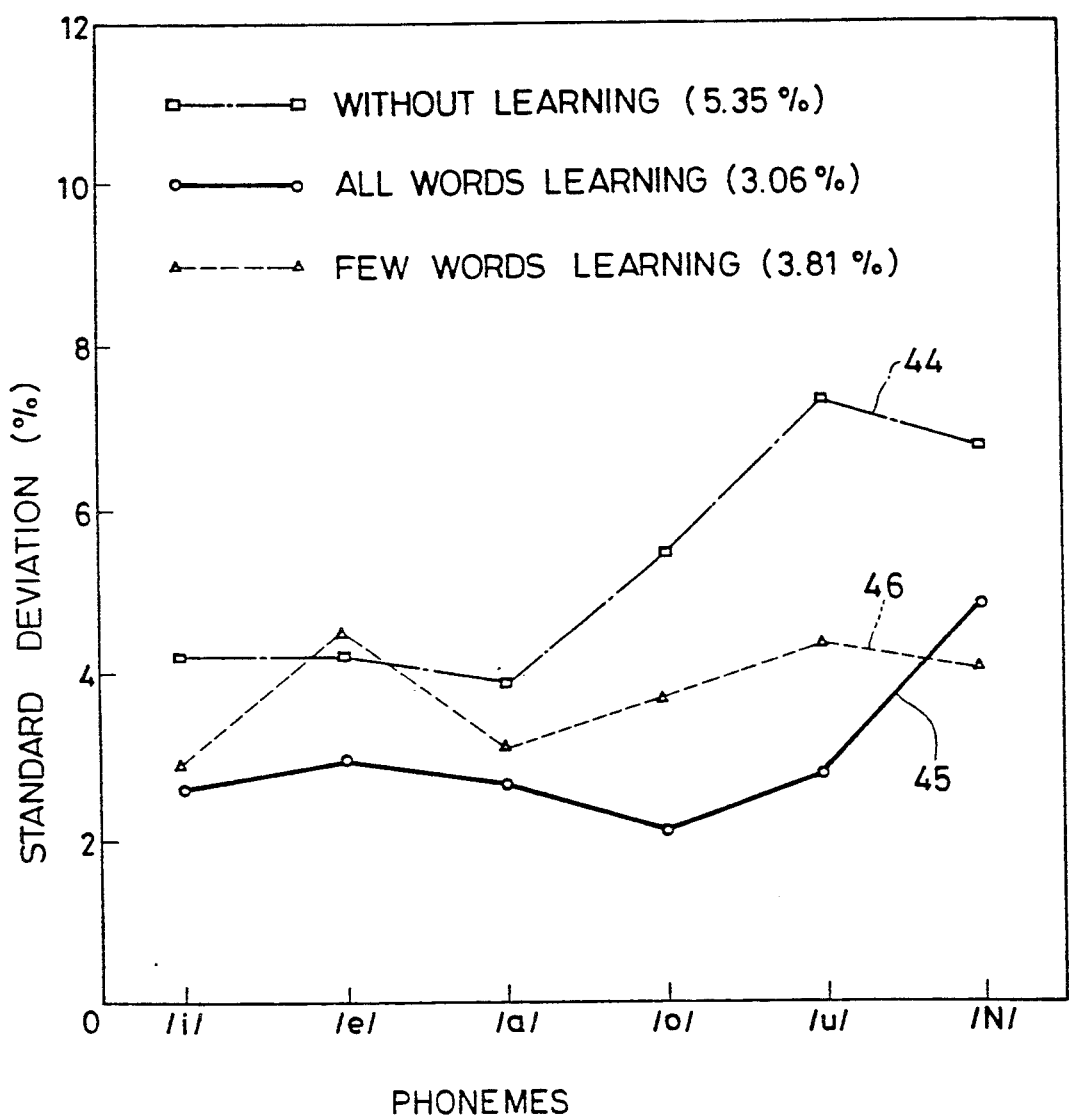
FIG. 4 is an explanatory graph of speech recognition results according to the present invention, as a function of standard deviation.

FIG. 4 is a plot of recognition rate standard deviation for various phonemes, obtained through learning (see curves 45 and 46) and without learning (see curve 44). Curve 45 is obtained when all words are spoken, while the curve 46 is obtained when a small number of words are spoken. For the cases of curves 45 and 46 (involving learning), the phoneme dispersion is small compared to the case of curve 44 (involving no learning). As a result, it will be understood that learning provides a high recognition rate with advantageous effects on the following word matching/comparison.

The advantages provided by the embodiment of FIG. 2 are:

(1) Improved speech recognition rate without suffering from environment changes or scattering among individual sound characteristics. This occurs since the speech recognition apparatus involves a learning function, enabling standard patterns suitable for a present speaker to be readily and automatically produced.

(2) Learning may occur either prior to speech recognition or automatically during speech recognition by having a present speaker utter a small number of words. Furthermore, standard patterns may be simply produced at a high speed without using special apparatus.

Figure 5:
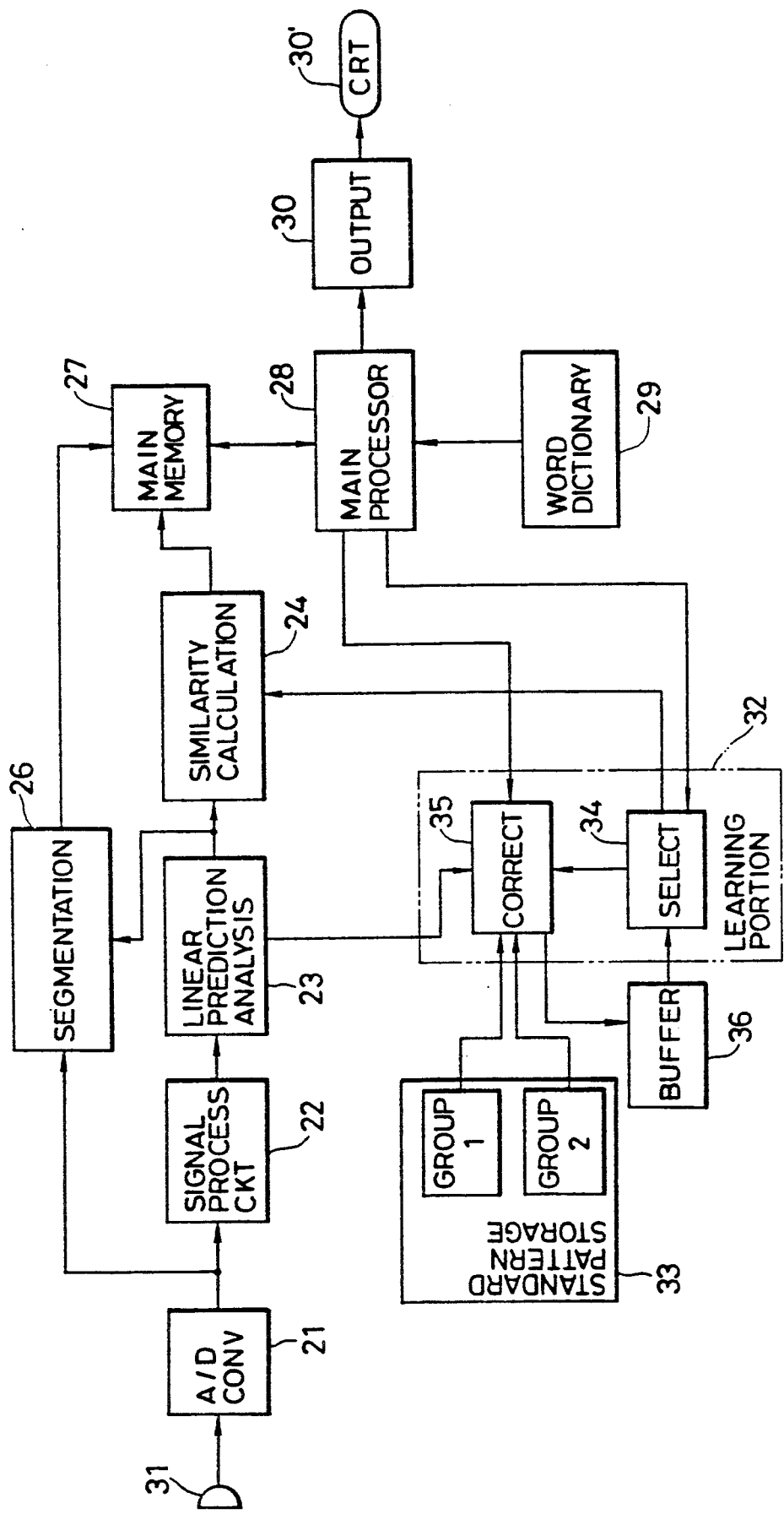
FIG. 5 is a schematic block diagram of a second embodiment of the speech recognition apparatus according to the present invention.

FIG. 5 is a schematic functional block diagram of a second embodiment of the present invention wherein words uttered by plural speakers are analyzed in advance such that resultant data are divided into plural groups, such as men, women, children and so on. Each spoken word in each group is divided into phonemes in advance. The following description is made on an assumption that two groups, group 1 for men and group 2 for women, are provided where words in each group are divided into phonemes /a/, /i/, /u/, /e/, /o/ and a nasal sound.

Initially the contents to be stored in standard pattern memory 33 are described. Assume that a mean value of the LPC cepstrum coefficients of phoneme i in group 1 is expressed by:

$$m_i^{(1)} = (m_{i1}^{(1)}, m_{i2}^{(1)}, \ldots, m_{ij}^{(1)}, \ldots, m_{ip}^{(1)})$$

wherein reference (1) indicates group 1, and reference p indicates the order of analysis.

In addition, assume that a covariance matrix common to the six phonemes is expressed in terms of $W^{(1)}$, and its inverse matrix $W^{-1(1)}$ is obtained where an element $jj'$ thereof is expressed by $\rho^{jj'}$. Then inverse matrix $W^{-1(1)}$ and mean value $m_i^{(1)}$ are stored in the standard pattern storage 33 as a standard pattern group 1. Similarly, mean value $m_i^{(2)}$ and inverse matrix $W^{-1(2)}$ are obtained using words of group 2 to be stored as a standard pattern group 2.

A weighting coefficient for the $j^{th}$ order of phoneme i of group 1 is obtained in the same manner as described for Formula (2) using $\delta^{ij}$ for element (j,j') of inverse matrix $W^{-1(1)}$ as follows:

$$a_{ij}^{(1)} = 2 \sum_{j=1}^{p} \delta^{ij} m_{ij}^{(1)} \tag{5}$$

In addition, the average distance $d_i^{(1)}$ of phoneme i is given by:

$$d_i^{(1)} = m_i^{(1)t} W^{-1(1)} m_i^{(1)} \tag{6}$$

wherein t indicates a transpose of a matrix.

Also in connection with group 2, $a_{ij}^{(2)}$ and $d_i^{(2)}$ are obtained, and then $a_{ij}^{(1)}$, $d_i^{(1)}$, $a_{ij}^{(2)}$, $d_i^{(2)}$ are stored in advance in buffer 36.

Although the weighting coefficients $a_{ij}$ and the average distances $d_i$ are stored in the buffer 36 in this embodiment, these data may be stored in standard pattern memory 33. In such a case, buffer 36 would be unnecessary.

The selecting function of the second embodiment will be described under the assumption that the LPC cepstrum coefficients are used as spectrum information.

Standard pattern group automatic selection, a feature of the present embodiment, is described with reference to the FIG. 5 block diagram and FIG. 6 flowchart. The FIG. 6 flowchart assumes that an arbitrary word, such as "hajime", is transduced by microphone 31. The word is transduced in step A, and is A/D converted in step B; then digital data obtained as a result of the A/D conversion are processed in two different parallel flow paths. More specifically, the digital signal is fed to the signal processor 22 where pre-emphasis and window calculation of Humming window are performed (see step C). The digital signal is also fed to segmentation portion 26. The digital data subjected to pre-emphasis and the Humming window calculation are then fed to linear prediction analysis portion 23 where linear prediction analysis is performed to obtain LPC cepstrum coefficients $C=(C_1, C_2, \ldots C_j, \ldots C_p)$ (see step D). LPC cepstrum coefficients C are fed to the similarity calculating portion 24.

Segmentation portion 26 executes band pass filter calculations in step E, and then determines whether a phoneme is a voiced sound/ unvoiced sound Portion 26 detects sound periods in step F using the LPC cepstrum coefficients C, and then segments and discriminates consonants in step G. The results of these steps are then stored in main memory 27 during step H.

As seen in FIG. 5, learning portion 32 in this embodiment comprises correction portion 35 and selection portion 34. Selection portion 34 feeds signals representing the values of $a_{ij}^{(1)}$ and $d_i^{(1)}$, as prestored in buffer 36, to similarity calculating portion 24 in step I. In response to such data, similarity calculating portion 24 obtains a similarity value $l_i^{(1)}$ in step J using the formula;

$$l_i^{(1)} = \sum_{j=1}^{p} a_{ij}^{(1)} C_j - d_i^{(1)} \tag{7}$$

Preferably, similarity is obtained on the basis of statistical distance measure such as Bayes' discriminant or Mahalanobis' distance. In the same manner as the above, similarity $l_i^{(2)}$ is obtained in connection with group 2, and the obtained data are stored in main memory 27 during step K.

In step L, the main processor 28 determines vowel portions, /a/ and /i/, and nasal sound portions /m/ and /e/ of the input sound "hajime" in response to the signal resulting from segmentation as well as the similarity to vowel and nasal sounds. Then the center frame which is most like the vowel or the nasal sound is selected from the determined vowel portion and nasal sound portion in connection with each vowel portion and nasal sound portion. The above-mentioned center frame may simply be (1) the center frame or (2) the frame having the greatest similarity. Then information indicative of the center frame position is fed to selection portion 34 of learning portion 32.

Selection portion 34 then obtains during step M the total sum $L^{(1)}$ of the center frame similarity $l_i^{(1)}$ as:

$$L^{(1)} = \sum_{n=1}^{N} \sum_{i=1}^{K} l_i^{(1)} \qquad (8)$$

where

K is the number of phonemes prepared in advance; K being 6 in this embodiment; and N is the number of center frames. A total sum $L^{(2)}$ is obtained for standard pattern group 2. Then $L^{(1)}$ is compared with $L^{(2)}$ to determine which is greater. If $L^{(1)}$ is greater than $L^{(2)}$, the input sound is determined as belonging to standard pattern group 1 in step N. The determination of to which standard pattern group the sound belongs may be performed by comparing the numbers of standard patterns having greatest similarity. For instance, the similarities $l_1^{(1)}, l_2^{(1)}, \ldots, l_k^{(1)}$ and $l_1^{(2)}, l_2^{(2)}, \ldots, l_k^{(2)}$ at the first center frame, i.e. /a/ of "hajime" of the vowels and nasal sounds of the input sounds are first obtained; when max $(l_1^{(1)}, l_2^{(1)}, \ldots, l_k^{(1)}$ and $l_1^{(2)}, l_2^{(2)}, \ldots, l_k^{(2)})$ equals $l_i^{(1)}$, the input sound is considered to belong to standard pattern group 1. Then such a determination is obtained for the N center frames, i.e. the four center frames for /a/, /i/, /m/ and /e/. It is then determined that the utterance belongs to the standard pattern group having the greatest number of stored utterances. As such a function is assigned to learning portion 32 automatic selection of a standard pattern group is also possible. Therefore, a similarity calculation will be performed using data stored in buffer 36 such that the data are limited to only data corresponding to the selected standard pattern group 1 for subsequently transduced utterances. Accordingly, there is no need to perform a similarity calculation for data corresponding to all standard pattern groups within buffer 36 as in conventional apparatus. Therefore, the amount of calculation is drastically reduced, while phoneme confusion is reduced to improve recognition rate.

The above-described learning function, referred to hereinafter as the first function, provides a recognition rate much higher than that of conventional apparatus. If it is intended to further increase the recognition rate, another function may be added to the above-described learning function. In some cases it is difficult to recognize utterances with only the learning function because the standard patterns are not suitable for the speaker or because of an acoustic environment change. In these instances a standard pattern automatic correcting function may be added so to cause the speech recognition apparatus to instruct the speaker what sounds he should utter so the standard patterns are modified to be most suitable for the speaker. The standard pattern automatic correcting function, therefore, provides so called speaker adaptability.

Hence, a second embodiment involving the above-mentioned automatic correcting function is described with reference to FIGS. 5 and 7. The speech recognition apparatus first instructs a speaker to pronounce a predetermined word or words, such as "naninuneno." Such instructions may be visually given on CRT 30' or aurally with a loudspeaker (not shown). Data indicative of the predetermined word are read out from a memory by main processor 28. In response to the instruction the speaker pronounces an utterance that is transduced by microphone 31 as shown in step A of the flowchart shown in FIG. 7. This sound is processed in the same manner as in the flowchart of FIG. 6, such that A/D conversion is performed (step B) by A/D converter 21, pre-emphasis and window calculation are executed (step C) by signal processing circuit 22, LPC cepstrum coefficients are obtained (step D) by linear prediction analysis processor 23, $a_{ij}$ and $d_j$ prestored in buffer 36 are sent via selection portion 34 of learning portion 32 to similarity calculating portion 24 (step I), similarity calculation is executed using Formula (7) (step J), and the results of the similarity calculation are fed to main memory 27 (step K).

On the other hand, the A/D converted sound signal is subjected to a filter calculation (step E), thence is detected for the voiced sound feature/unvoiced sound feature as well as for sound period (step F), consonant segmentation and consonant detection (step G) (a consonant /n/ of "naninuneno" being detected). The signals are fed to main memory 27 (step H), where they are stored. In step L, vowel portions and nasal sound portions are detected in the same manner as in FIG. 6 so that a center portion of each of /a/, /i/, /u/, /e/, /o/, /n/ of "naninuneno" is automatically detected, and positional information thereof is fed to the correcting portion 35 of the selection portion 34 of the learning portion 32.

In selecting portion 34, the similarity sum L is obtained for each standard pattern using Formula (8) (step M), and a determination is made as to whether the sound belongs to a standard pattern group having a greater value of the similarity sum L (step N).

On the other hand, correcting portion 35 reads out element $\delta_{ij}'$ inverse matrix $W-(1)$ and a standard pattern group mean value $m_{ij}^{(1)}$ based on the learning function of selection portion 31. From the standard pattern storage 33 using $C_{ij}$ for LPC cepstrum coefficients corresponding to the center portion of the phoneme i sent from the linear prediction analysis processor 23, the processor obtains, in a step Q, a mean value $m'_{ij}^{(1)}$ suitable for the present speaker as follows:

$$m'_{ij}^{(1)} = (wm_{ij}^{(1)} + C_{ij})/(w+1) \qquad (9)$$

wherein w is a predetermined constant.

The method of obtaining the mean value may be changed by using a multiple regression analysis for obtaining a new mean value $m_{\alpha'}$ of $\alpha^{th}$ order of a given phoneme. According to this method, all phoneme-related data are used, based on the presumption of a feature parameter of $\alpha^{th}$ order. More specifically, it is assumed that there is a relationship between a predetermined average value $Q_\alpha(k)$ of plural speakers and learning data $V^{(k)}$ as represented by:

$$Q_\alpha^{(k)} = b_\alpha' + \beta'_\alpha V^{(k)} + \epsilon_\alpha^{(k)} \qquad (10)$$

where
$\alpha = 1, 2, \ldots, j, \ldots, p$;
$k = 1, 2, \ldots, k$;
$\beta'_\alpha = (\beta'_{\alpha 1}, \beta'_{\alpha 2}, \ldots, \beta'_{\alpha j}, \ldots, \beta'_{\alpha p})$
$\epsilon_{\alpha k}$ = is a presumed error value;
p = the parameter order;
k = the number of prepared speakers.

Using $b_\alpha$, and $\beta_\alpha$ respectively for the values assumed by the method of least squares for $b_\alpha'$ and $\beta_\alpha'$, an assumed value m for the average of a given phoneme is obtained by the following formula using LPC cepstrum coefficients $C = (C_1, C_2, \ldots, C_j, \ldots, C_p)$ of inputted learning data.

$$m_j' = b_\alpha + \beta_\alpha C = b_\alpha + \sum_{j=1}^{p} \beta_{\alpha j} \cdot C_j \qquad (11)$$

The $\beta_{\alpha j}$ and $b_\alpha$ coefficients are obtained from the following formula using prepared values of $Q_\alpha^{(k)}$ and $V_j^{(k)}$:

$$\beta_{\alpha j} = \sum_{j=1}^{p} S_\alpha^{jj} S_{\alpha j y} \qquad (12)$$

where $$S_\alpha^{jj} = \sum_{k=1}^{K} (V_{\alpha j}^{(k)} - \overline{V}_{\alpha j})(V_{\alpha j}^{(k)} - \overline{V}_{\alpha j}) \qquad (13)$$

$$S_{\alpha j y} = \sum_{k=1}^{K} (V_{\alpha j}^{(k)} - \overline{V}_{\alpha j})(Q_\alpha^{(k)} - \overline{Q}_\alpha) \qquad (14)$$

$\overline{V}_{\alpha j}$ and $\overline{Q}_\alpha$ are respectively the average values of $V_{\alpha j}^{(k)}$ and $Q_\alpha^{(k)}$ (k = 1, 2, ..., K);
$S_\alpha^{ij}$ is the value of an element in an inverse matrix of $S_{\alpha jj'}$.
In addition $b_i$ can be obtained using:

$$b_\alpha' = \overline{Q}_\alpha - \sum_{j=1}^{p} \beta_{\alpha j} \cdot \overline{V}_{\alpha j} \qquad (15)$$

Therefore, if $\beta_{\alpha j}$ and $b_\alpha$ are obtained in advance using formulas (12) and (15) using data from plural speakers to supply correcting portion 35 with these data, a new mean value $m'_\alpha$ can be calculated from formula (11).

Using the mean value $m'_{ij}^{(1)}$ obtained in this way, a new weighting coefficient $a'_{ij}^{(1)}$ and an average distance $d_i'^{(1)}$ are respectively obtained in step R as follows:

$$a'_{ij}^{(1)} = 2 \sum_{j=1}^{p} \delta_{jj} m'_{ij}^{(1)} \qquad (16)$$

$$d_i'^{(1)} = m_i'^{(1)t} W^{-1(1)} m_i'^{(1)} \qquad (17)$$

Then signals representing the values of $a'_{ij}^{(1)}$ and $d_i'^{(1)}$ are stored during step S in buffer 36 as a new standard pattern group.

As a result, a subsequently transduced phoneme is processed in steps A to J of the flowchart of FIG. 6 so that similarity is calculated as:

$$f_i^{(1)} = \sum_{j=1}^{p} a_{ij}'^{(1)} C_j - d_i'^{(1)} \qquad (18)$$

A signal representing the calculation result is fed to main memory 27 to cause main processor 28 to derive a phoneme or syllable string representing signal using the result from the segmentation portion 26. Then word recognition is executed by comparing the words stored in word dictionary memory 29 with the word derived by processor 28. The comparison result, i.e., the word stored in memory 29 closest to the word derived by the processor, is fed to output portion 30.

In this way, the contents of the standard patterns are automatically corrected to increase the recognition rate even for a speaker whose utterances do not match the standard patterns. With the operation of the first and second functions of learning portion 32, a standard pattern group which is suitable for the speaker is automatically selected, and the contents of the selected standard patterns are automatically corrected for recognition of utterances of the speaker. Accordingly, it is possible for any speakers to provide a high recognition rate, with high stability and reliability.

Figure 8:
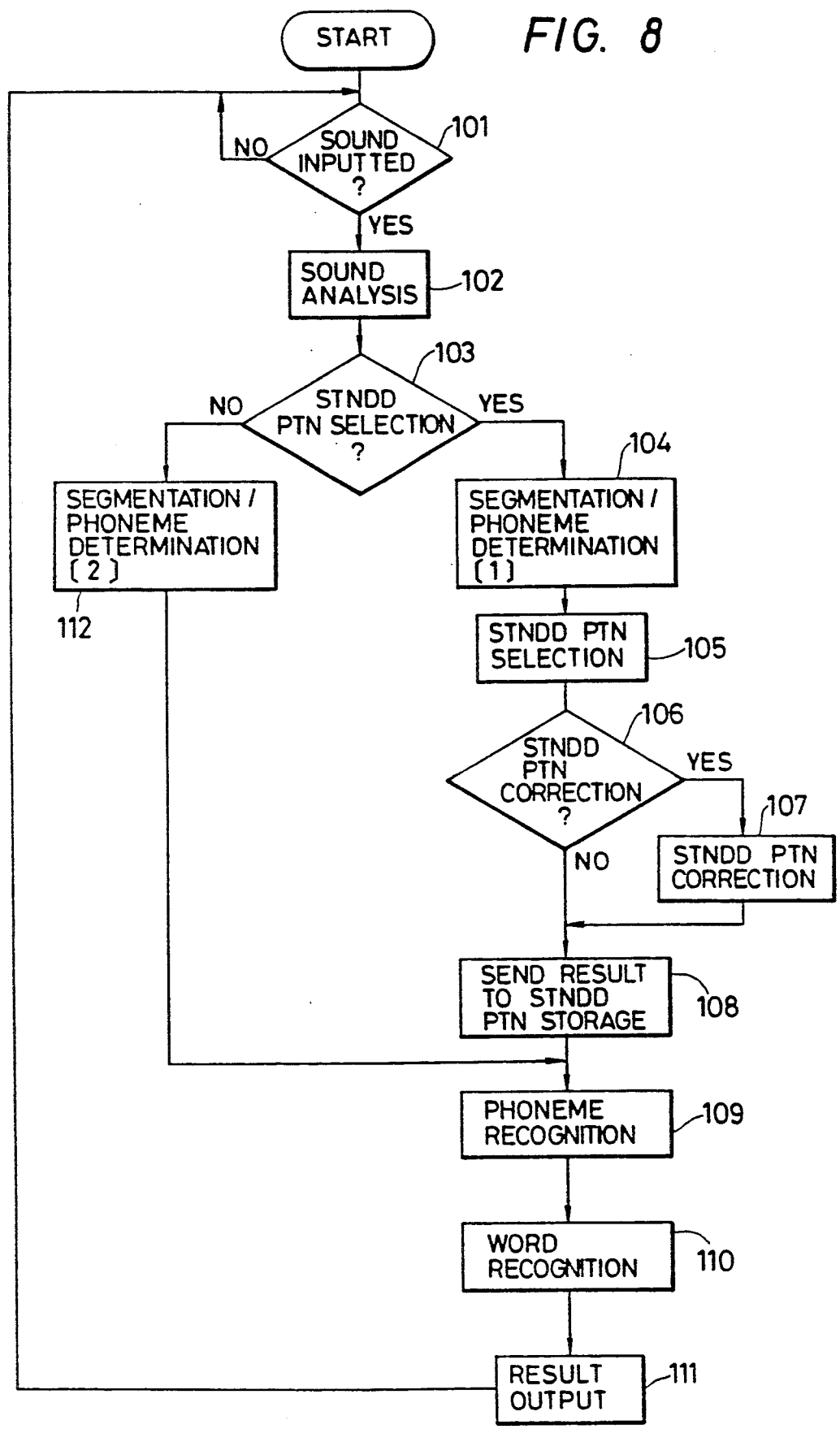
FIG. 8 is a speech recognition flowchart according to the present invention.

The general processing step flow in the above-described embodiments is now described with reference to the flowchart of FIG. 8. Initially, an utterance in the form of an arbitrary sound from a speaker is detected in step 101. Then the speech recognition apparatus analyzes the sound in step 102. Then in step 103, a determination is made as to whether a standard pattern group should be selected. If such a selection is necessary, phonemes are segmented and determined during step 104. Then the standard pattern group having the largest total similarity sum is determined during step 105 on the basis of the results of step 104. Then in step 106 a determination is made as to whether correction of the selected standard patterns is necessary. If the correction is unnecessary, the selected standard pattern group is fed to the standard pattern memory in step 108. The phoneme recognition is executed in step 109 using the standard patterns and the segmentation result. In step 110 the phoneme recognition result is compared with word stored in the word dictionary to recognize the transduced word. The recognized word is outputted in step 111. After step 111, the operational flow returns to step 101, while the system waits for a subsequent input sound.

For a subsequently inputted sound, since the selection of the standard pattern group has been completed, the selected and registered standard pattern groups are used for executing segmentation and phoneme determination [2] in step 112, and then steps 109 and 110 are subsequently executed for outputting the recognized results.

In the above, the difference between segmentation and phoneme determinations [1] and [2] is that [2] requires calculation with only a single selected standard pattern group whereas [1] requires calculation in connection with all the standard pattern groups stored in the standard pattern storage. As a result, operation [1] requires a large amount of calculation. However, [1] is used for only a period immediately after the speech recognition apparatus starts operating; therefore, the large amount of calculation does not raise a problem in practical use.

The second function is now described. In the flowchart of FIG. 8, when sounds having designated contents, such as "naninuneno" are uttered, step 101 for the detection of the input sounds is executed. Then steps 102 and 103 are executed in the same manner as in the first function. Step 104 is executed for segmentation and phoneme determination [1]. Standard patterns are selected in step 105. Then in step 107, the contents of the selected standard pattern group are corrected so they are suitable for the input sounds. The corrected contents of the standard pattern group are then fed to the standard pattern storage in the step 108. Then, phoneme recognition (step 109), word recognition (step 110) and outputting of the recognized results (step 111) are executed in the same manner as in the first function.

For subsequently inputted sounds, since the selection and correction of standard pattern group have been completed, the corrected standard pattern group is used for executing segmentation and phoneme recognition [2]. Then phoneme recognition (step 109), and word recognition (step 110) are executed.

If the speech recognition apparatus according to the present invention has both the automatic selecting function (first function) and the automatic correcting function (second function) these operations are executed such that the standard pattern group is initially automatically selected on the basis of arbitrary sounds, and then automatic correction is performed with specific sounds being inputted. These operations are performed in this manner in contrast to the operations described in connection with the above embodiment wherein automatic selection and correction of the standard pattern group are executed on the basis of specific sounds.

Figure 9:
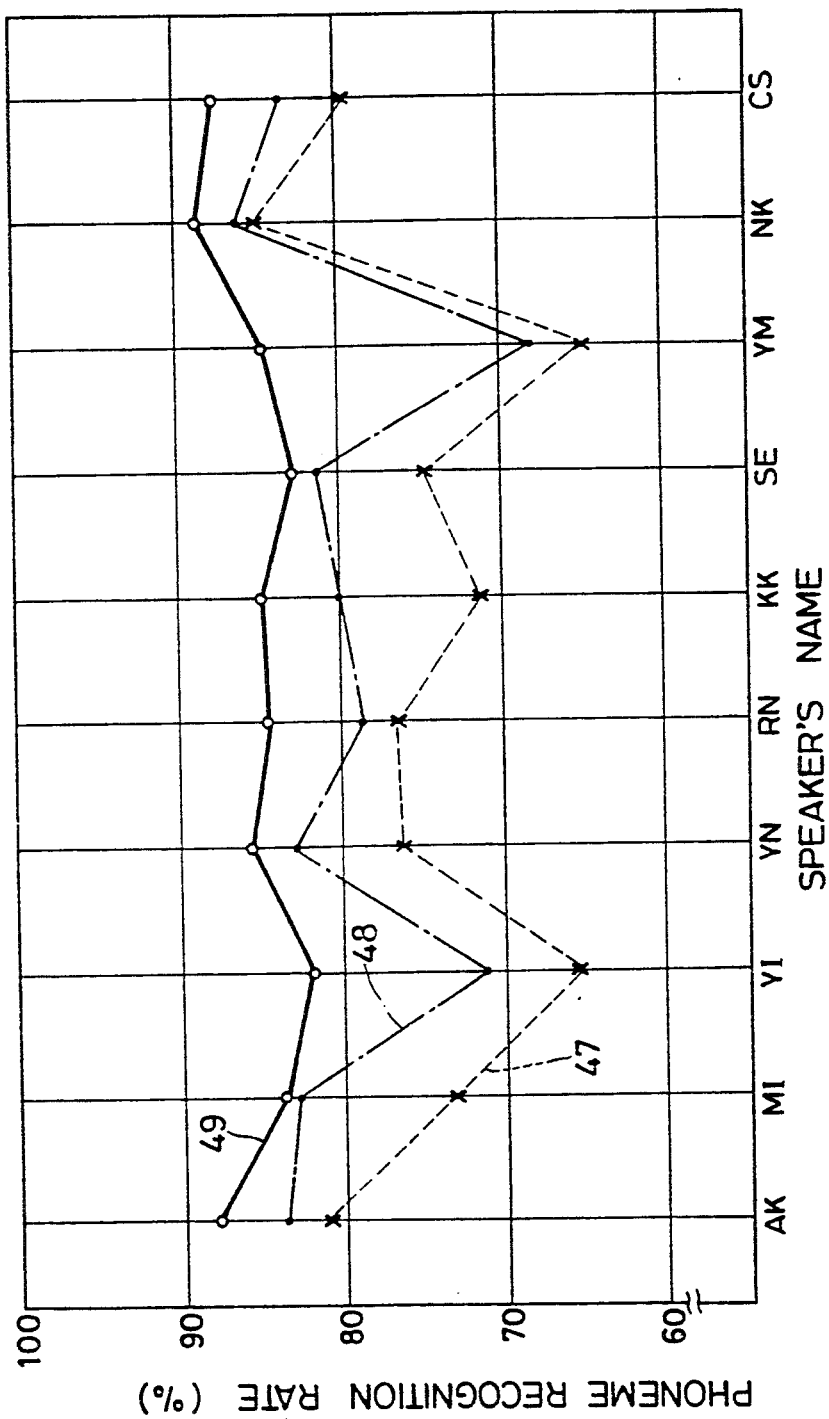
FIG. 9 is a graph wherein phoneme recognition rate according to the present invention is compared with that of a conventional example.

To evaluate the efficacy of the second function, the phoneme recognition rate was obtained about ten women. The evaluation was made using an average recognition rate and standard deviation indicative of dispersion about five vowels and nasal sounds /m/, /n/, and /N/. The results of this experiment are illustrated in FIG. 9 wherein the X axis represents ten female speakers, and the Y axis represents phoneme recognition rate. Curve 47 indicates recognition rate obtained according to the conventional method such that a phoneme corresponding to a standard pattern having the highest similarity among all provided standard pattern groups is treated as the recognition result. According to this conventional method, an average recognition rate is 74.6%, with a standard deviation of 6.01%. Curve 48 indicates the efficacy of the first function (automatic selection); it will be understood that when women are correctly classified into the women group, the recognition rate can be improved from the conventional technique case because the standard pattern group exclusively provided for women is used. Accordingly, an average recognition rate of 79.4% and a standard deviation of 5.34% are obtained. This means that the average recognition rate has been improved from the conventional example by 4.8%, while the dispersion has been reduced. Curve 49 indicates the efficacy of the second function (automatic correction); the recognition rate can be remarkably improved because the contents of the standard pattern group exclusively provided for women are corrected using known input sounds, such as "naninuneno." An average recognition rate of 85.0% and a standard deviation of 2.01% are obtained with this second function. This means that the average recognition rate has been drastically improved by 10.4% compared to the conventional case. The utterance recognition rates for speakers YI, YM and KK whose recognition rates are very low according to the conventional technique, is remarkably improved by the present invention with a dispersion reduction of one half or less. Thereby, stable recognition occurs even with speaker changes.

Figure 10:
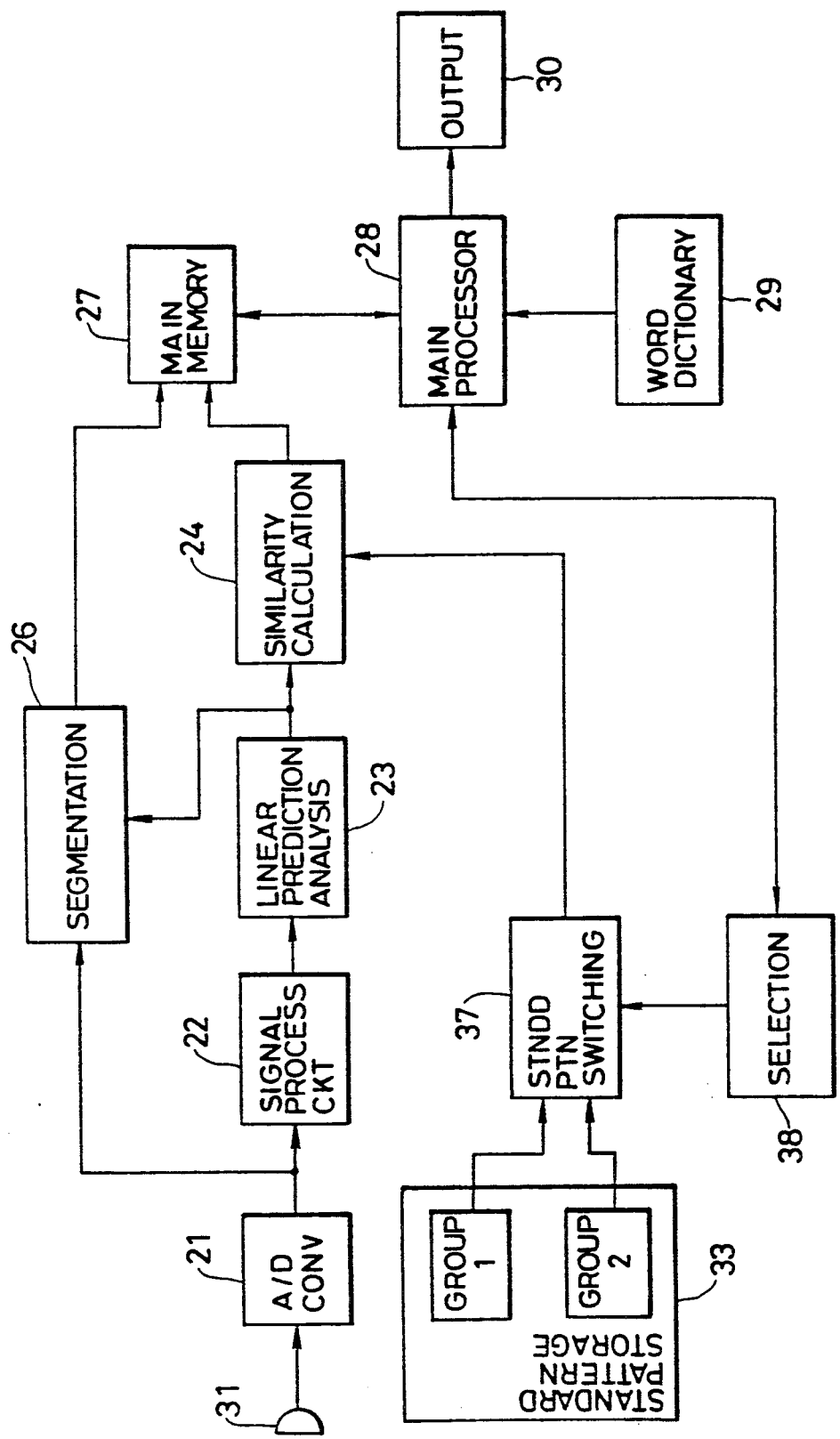
FIG. 10 is a schematic block diagram of a third speech recognition apparatus embodiment according to the present invention.

A third embodiment is now described with reference to FIG. 10. Data to be prestored in the standard pattern storage 33 are first described. In this embodiment several standard pattern groups for men, women, children, aged persons and so on are provided. However, the embodiment is described in connection with an example in which mean values are obtained only about men (group 1) and women (group 2) and a covariance matrix is obtained about both groups. Thereby, the standard pattern, in the form of weighting coefficients $a_{ij}$ and average distance $d_i$, is obtained using the mean values to be stored in the standard pattern storage 33.

Initially, in the same manner as in FIG. 5, the mean value of LPC cepstrum coefficients of phoneme i for sounds in group 1 is given by:

$$m_i^{(1)} = (m_{i1}^{(1)}, m_{i2}^{(1)}, \ldots, m_{ip}^{(1)})$$

where
(1) indicates group (1); and
p indicates the number of used parameters.

In the case where each standard pattern is formed with a frame unit, p=q where q is the order of the LPC cepstrum coefficients. In the case of a standard pattern with n frame time patterns, p=q×n.

Similarly, the mean value of LPC cepstrum coefficients of phoneme i of sounds in group 2 is given by:

$$m_i^{(2)} = (m_{i1}^{(2)}, m_{i2}^{(2)}, \ldots, m_{ip}^{(2)})$$

These mean values are obtained for five vowels /a/, /i/, /u/, /e/, /o/ and a nasal sound for both groups (1) and (2) so that 12 mean values are obtained.

Using a mean value $m_i^{(1)}$ for group (1) and a mean value $m_i^{(2)}$ for group (2), a covariance matrix common to 12 phonemes is expressed in terms of R, having an inverse matrix $R^{-1}$. By expressing an element (j, j') of $R^{-1}$ in terms of $Y_{jj'}$, a weighting coefficient with respect to the $j^{th}$ order of the LPC cepstrum coefficients for phoneme i of group (1) is obtained from:

$$a_{ij}^{(1)} = 2 \sum_{j=1}^{p} \gamma_{jj'} m_{ij}^{(1)} \qquad (19)$$

The average distance $d_i^{(1)}$ to phoneme i is obtained from:

$$d_i^{(1)} = m_i^{(1)t} R^{-1} m_i^{(1)} \qquad (20)$$

where t indicates a matrix transpose.

Signals representing the values $a_{ij}^{(1)}$ and $d_i^{(1)}$ are obtained for the respective phonemes, and are stored in addresses of standard pattern memory 33 designated for standard pattern group 1.

In the same manner, signals representing the values of $a_{ij}^{(2)}$ and $d_i^{(2)}$ are obtained for group (2) and stored in addresses of the standard pattern memory 33 designated for the standard pattern group 2.

In the above, the covariance matrix may also be obtained separately for groups (1) and (2).

The operation of similarity calculating portion 24 is now described. When unknown utterances are transduced by microphone 31, signal processing circuit 22 performs pre-emphasis and window calculation, and linear prediction analysis processor 23 obtains LPC cepstrum coefficients $C_j$ (j = 1, 2, ..., p). Assume that the transduced unknown utterance is "hajime." If a time pattern is used LPC cepstrum coefficients $C_1$ through $C_p$ of n frames are arranged in order. Similarity calculating portion 24 calculates similarity using $C_j$ and standard patterns fed through a standard pattern switching portion 37. The similarity $l_i^{(1)}$ for phoneme i of group (1) is obtained from:

$$l_i^{(1)} = \sum_{j=1}^{p} a_{ij}^{(1)} C_j - d_i^{(1)} \qquad (21)$$

A similar calculation is performed for group (2) as:

$$l_i^{(2)} = \sum_{j=1}^{p} a_{ij}^{(2)} C_j - d_i^{(2)} \qquad (22)$$

In this way similarity values are obtained for 12 phonemes; the obtained similarity data are fed to main memory 27.

Segmentation portion 26 calculates band power level and determines voiced sound feature/unvoiced sound feature, thereby determining sound periods and detecting consonant periods, such as /h/, /j/ and /m/ of "hajime"; the obtained data are fed to main memory 27. Main processor 28 determines the vowel period /a/, /i/, /e/ and the /m/ nasal sound periods using the similarity and consonant periods stored in main memory 27, and obtains N centers of phonemes, such that N=4. In the above "center" means a midway location, or a position where the similarity is the highest.

In selection portion 38, the greatest similarity is initially obtained for the respective groups for all of the stored phonemes /a/, /i/, /u/, /e/, /o/ at the phoneme centers; the values for the stored phonemes are obtained by the above method. Four phonemes /a/, /i/, /m/, /e/, $l_i^{(1)}$ and $l_i^{(2)}$ are respectively used for group (1) and group (2). The data are respectively obtained for the centers of N phonemes; the similarity sums for groups (1) and (2) are respectively expressed in terms of $L^{(1)}$ and $L^{(2)}$ as:

$$L^{(1)} = \sum_{i=1}^{N} l_i^{(1)} \qquad (23)$$

$$L^{(2)} = \sum_{j=1}^{N} l_j^{(2)} \qquad (24)$$

Using these values of $L^{(1)}$ and $L^{(2)}$, reliability Re is defined as follows:

$$Re^{(1)} = L^{(1)} - L^{(2)} \qquad (25)$$

If there are more than two groups, the similarity sum is obtained for each group, and Formula (25) is used to determine reliability, $Re^{(1)}$ from the two largest values and the second largest among the sum values.

When $Re^{(1)}$ is a positive value and exceeds a predetermined threshold, the utterance of the speaker is determined to be from group (1). On the contrary, when $Re^{(1)}$ is negative and has an absolute value exceeding the threshold, the utterance of the speaker is determined to be from group (2). If the group determination, executed as $Re^{(1)}$, exceeds the threshold, selection portion 38 instructs standard pattern switching portion 37 to supply standard patterns for only the determined group, e.g. group 1 or group 2, to similarity calculating portion 24; selection portion 38 then terminates operation.

If Re does not exceed the threshold, selection portion 38 instructs standard pattern switching portion 37 to select standard patterns of both groups (1) and (2). Selection portion 38 further instructs main processor 28 to use the similarity of group 1 when Re has a positive value and the similarity of group (2) when Re has a negative value.

Therefore, as long as the value of reliability, Re, does not exceed the threshold, main processor 28 follows instructions from selection portion 38 and recognizes phonemes in response to the instructed similarity. Then main processor 28 compares the phoneme recognition result with words stored in dictionary 29 thereby recognizing a word such that a word having the greatest similarity is outputted to output portion 30.

As long as the reliability value, Re, does not exceed the threshold, standard pattern switching portion 37 follows instructions from selection portion 38 to send standard pattern group 1 and standard pattern group 2 successively. Similarity calculating portion 24 repeats the similarity calculations for standard pattern groups 1 and 2. Although similarity calculating portion 24 makes a large number of calculations during the above operations, these calculations are performed only about a determined group after selecting portion 38 makes a selection. Therefore, the number of calculations is drastically reduced. Furthermore, main processor 28 is now able to perform phoneme recognition using standard patterns having high reliability so as to improve word recognition rate.

While the reliability value is calculated using the sum of the greatest similarity values in the above-described embodiment, reliability may also be obtained by checking th number of times the greatest similarity values are obtained. Assume that the greatest similarity among similarity values obtained by similarity calculating portion 24 is expressed in terms of $l_i^{(1)}$. Main processor 28 supplies selecting portion 38 with a signal indicative of the value of $l_i^{(1)}$. Then selecting portion 38 counts the number $N^{(1)}$ of $l_i^{(1)}$ in group (1). If a signal indicative of the value of $l_i^{(2)}$ is supplied by processor 28 to selecting portion 38, the selecting portion counts number of times $N^{(2)}$.

Reliability, Re, is calculated as:

$$Re^{(1)} = N^{(1)}/N^{(2)} \qquad (26)$$

$$Re^{(2)} = N^{(2)}/N^{(1)} \qquad (27)$$

A determination is made as to whether $Re^{(1)}$ or $Re^{(2)}$ exceeds a predetermined threshold to determine whether the speaker utterance is in group 1 or 2 such that when $Re^{(1)}$ exceeds the threshold, speaker utterance is determined to be in group 1; when $Re^{(2)}$ exceeds the threshold, the speaker utterance is determined to be in group 2. When neither $Re^{(1)}$ or $Re^{(2)}$ exceeds the threshold, $N^{(1)}$ is compared with $N^{(2)}$. Then main processor 28 is supplied with an instruction to use the similarity of the group having a value of n greater than that of the other for phoneme recognition.

An advantage of this method using the number of greatest similarity times compared to the similarity sum method, is that there is greater stability for factors, which distort the sound spectrum, such as noise.

If the number of groups is more than two, reliability Re, may be successively calculated for pairs of groups, and the values compared until the greatest reliability is found.

Figure 6:
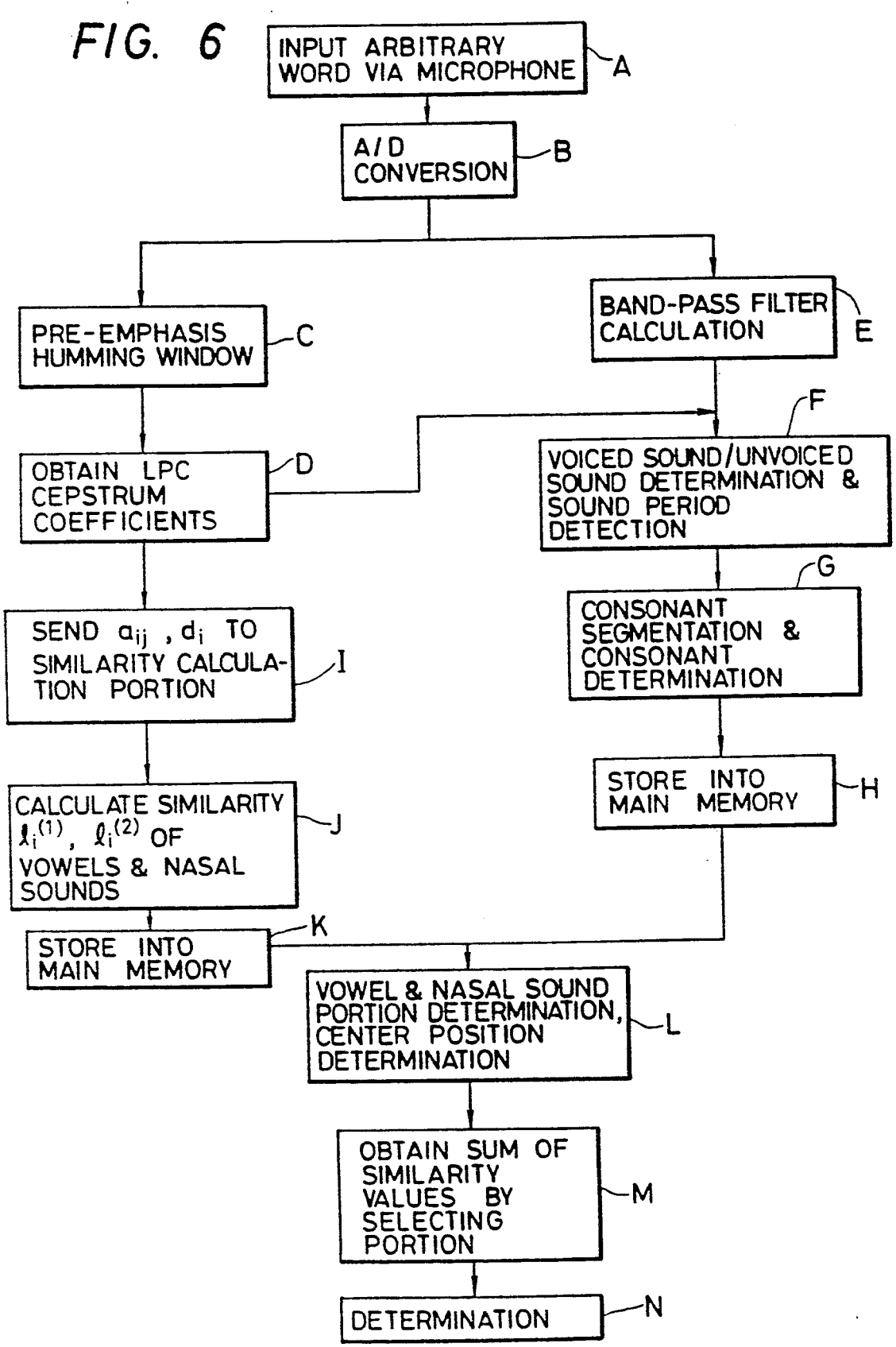
FIG. 6 is an automatic selection flowchart of standard pattern groups in an embodiment of the present invention.
Figure 7:
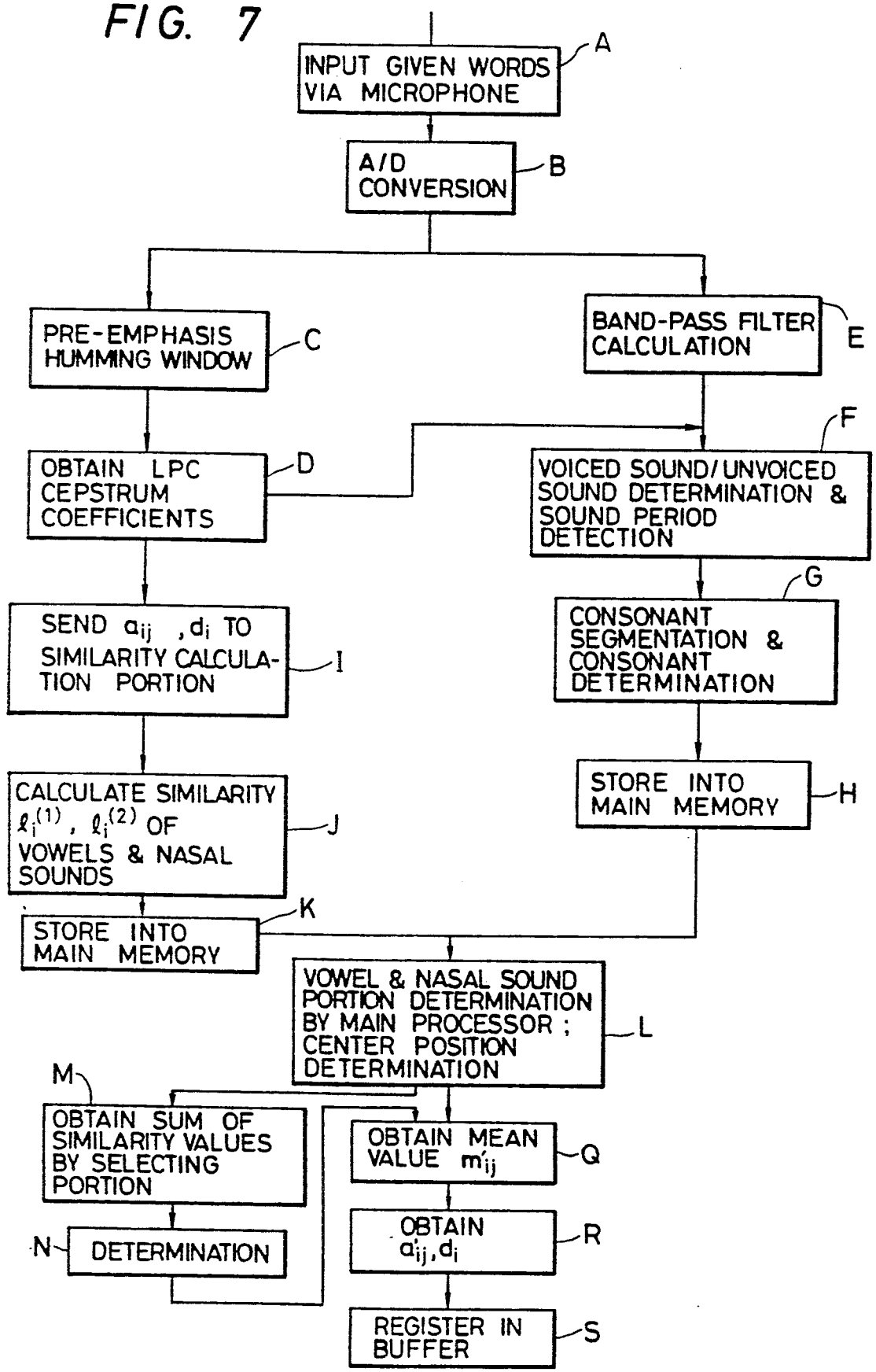
FIG. 7 is an automatic correction flowchart of standard pattern groups in another embodiment of the present invention.

Standard pattern group automatic selection is executed by the same process shown in the FIG. 6 flowchart.

Selecting portion 38 obtains the greatest similarity at the center frame for respective groups, and further obtains the sums $L^{(1)}$ and $L^{(2)}$ of the similarity values. Reliability is then calculated using Formula (25) or Formulae (26) and (27); a determination is then made as to whether the calculated reliability exceeds the threshold (see STEP N). In response to this determination, standard pattern switching portion 37 selects a standard pattern group stored in standard pattern storage 33.

Figure 11:
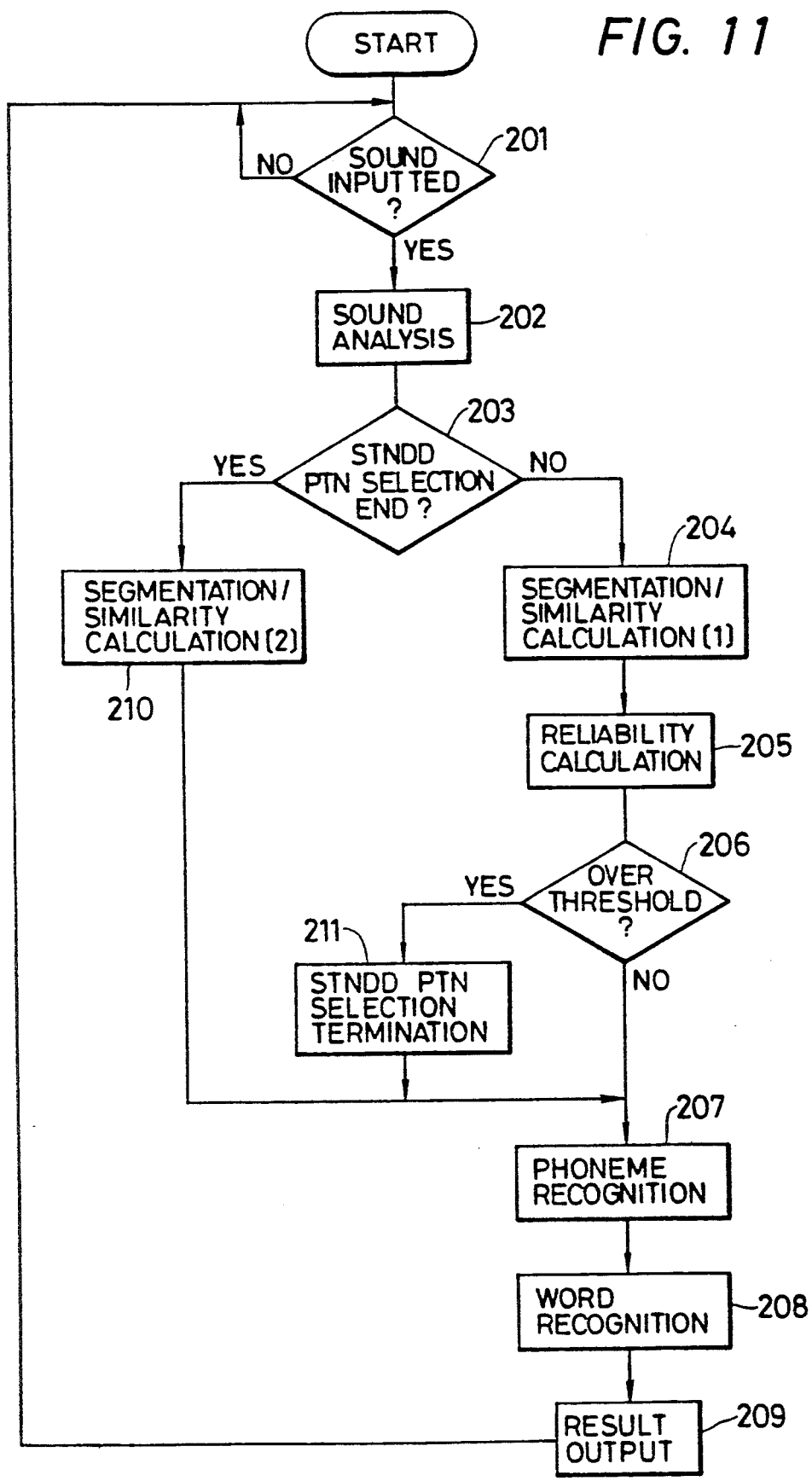
FIG. 11 is a speech recognition flowchart for the embodiment illustrated in FIG. 10.

FIG. 11 is a processing flowchart for the above-described speech recognition apparatus embodiment. Sound transduced in step 201 is analyzed in step 202. In step 203 a determination is made as to whether a standard pattern group should be selected. If not, the program proceeds to step 204 during which segmentation/similarity calculations [1] are executed. The similarity calculation is now executed for all the standard pattern groups. Next, in step 205, the center of each vowel phoneme and nasal sound in the utterance is extracted and reliability is calculated to determine which group is most reliable. In step 206 reliability is tested; if it is below the threshold, phoneme recognition is executed in step 207 using the similarity of the group having the greatest reliability. On the contrary, if the reliability is above the threshold, a standard pattern selection termination instruction is executed in step 211. Then phoneme recognition is executed in step 207 using the similarity of a group having a reliability exceeding the threshold. Using the phoneme recognition result, word recognition is executed in step 208 and the recognized word is derived in step 209. Then the operational flow returns to the step 201 until the next utterance occurs.

A subsequent utterance is checked in step 203 to determine whether a standard pattern selection termination instruction has been given; step 203 occurs after sound analysis step 202. If the pattern selection termination instruction has not been given, the above steps are repeated. If the instruction has been given, since a group has been selected, segmentation/similarity calculations [2] are executed in step 210. In step 210 the standard patterns of the selected group are used. After step 210 steps 207-209 for phoneme recognition are executed.

As described above, the operation flow in the speech recognition apparatus is simple. Therefore the speech recognition apparatus according to the present invention provides accurate recognition without involving complex calculations.

In TABLE 1 are shown the evaluation results for plural speakers belonging to the group of men or the group of women according to the present embodiment. The evaluation was made by obtaining the number of words necessary for exceeding the threshold for 100 speakers including 50 men and 50 women using the first ten words of 212 spoken words.

TABLE 1

| RELATIONSHIP BETWEEN THE NUMBER OF LEARNED WORDS AND SEX DETERMINATION | | | | | | | | | | | |
|---|---|---|---|---|---|---|---|---|---|---|---|
| | NUMBER OF LEARNED WORDS | | | | | | | | | | |
| SEX | 1 | 2 | 3 | 4 | 5 | 6 | 7 | 8 | 9 | 10 | ERROR |
| MEN | 42 | 3 | 2 | 2 | 0 | 0 | 0 | 0 | 1 | 0 | 0 |
| WOMEN | 47 | 1 | 0 | 1 | 0 | 0 | 0 | 0 | 0 | 0 | 1 |

TABLE 1-continued

| RELATIONSHIP BETWEEN THE NUMBER OF LEARNED WORDS AND SEX DETERMINATION | | | | | | | | | | | |
|---|---|---|---|---|---|---|---|---|---|---|---|
| | NUMBER OF LEARNED WORDS | | | | | | | | | | |
| SEX | 1 | 2 | 3 | 4 | 5 | 6 | 7 | 8 | 9 | 10 | ERROR |
| TOTAL | 89 | 4 | 2 | 3 | 0 | 0 | 0 | 0 | 1 | 0 | 1 |

From TABLE 1, group determination can be accurately made for about 98 persons out of 100 persons when at least four words are used. One of the remaining two persons is accurately classified using nine words. Since an erroneous group determination results in a considerable decrease in recognition rate of vowels and nasal sounds, such as from 88.4% to 59.3%, a large number of words must be used to avoid an error. While one erroneously determined person, a woman, was classified into the group of men, the recognition rate about this speaker suffers only a small decrease (such as 78.5% to 75.5%) in recognition rate for vowels and nasal sounds, even though the standard patterns the male speaker group are used. The sounds for this match the standard patterns for the male group; therefore the erroneous sex determination does not cause a problem. In this way, using the present embodiment, it is possible to determine sex with high accuracy while a high phoneme recognition rate is achieved even if the sex determination is wrong.

In TABLE 2 are shown the results of evaluation and comparison of average phoneme recognition rate for five vowels and nasal sounds with a frame unit for 20 speakers including men and women.

TABLE 2

| EVALUATION OF PHONEME RECOGNITION RATE | | |
|---|---|---|
| | WITHOUT SEX DISTINCTION | WITH SEX DISTINCTION |
| MEN | 80.9% | 82.2% |
| | (3.01) | (2.35) |
| WOMEN | 74.6% | 79.4% |
| | (6.01) | (5.34) |

In TABLE 2, in the "WITHOUT SEX DISTINCTION" mode, standard patterns for men and women are respectively provided in the conventional manner, and a standard pattern having the greatest similarity is determined as a result of recognition irrespective of sex. The "WITH SEX DISTINCTION" mode is used in the present embodiment. In TABLE 2, the frame recognition rate is shown as a function of percent, recognition rate dispersion is shown in brackets as a function of standard deviation.

As will be understood from a comparison between the two modes, recognition rate is improved according to the present embodiment while dispersion is reduced. The recognition rate for women is considerable improved and the dispersion for men is remarkably reduced, thereby demonstrating the efficiency of the present embodiment.

The above-described embodiments are just examples of the present invention, and therefore, it will be apparent to those skilled in the art that many modifications and variations may be made without departing from the spirit of the present invention.

What is claimed is:

1. A method for recognizing speech comprising:
    (a) performing a linear prediction analysis of plural phonemes including the vowels and a nasal sound to calculate $p^{th}$ order LPC cepstrum coefficients in response to periodic frame derived for plural word utterances by plural speakers;

(b) in response to the calculated LPC cepstrum coefficients calculating a covariance matrix W that is a function of all the phonemes and a mean value $m_i$ for each of the particular phonemes,
where
i represents the particular phoneme;

(c) deriving a weighting coefficient $$a_{ij} = 2 \sum_{j=1}^{p} \delta^{jj'} m_{ij'}$$

where
j = 1, 2 ... p
$\delta^{jj'}$ = value of element jj' of inverse matrix $W^{-1}$ of covariance matrix W;

(d) deriving the values $a_{ij}$, $\delta^{jj'}$, $m_{ij}$, and $m_i^t W^{-1} m_i$ for each of said phonemes as coefficient values for the phonemes;

(e) in response to known phoneme sounds being uttered by a speaker deriving the value of an LPC cepstrum coefficient for each phoneme;

(f) storing these LPC cepstrum coefficients with the previously stored coefficient values of the corresponding phonemes to derive standard patterns for the phonemes;

(g) during a recognition mode while replicas of unknown words including the phonemes are derived:
(i) performing phoneme segmentation of each unknown word and
(ii) for each segmented phoneme determining the similarity of LPC cepstrum coefficients of each segmented phoneme of the unknown words with the stored coefficient values of the standard patterns for the phonemes in accordance with $$L_i = \sum_{j=1}^{p} a_{ij} x_j - m_i^t w^{-1} m_i$$

where t is a matrix transportation factor;

(h) selecting the standard phoneme most similar to the uttered phoneme in response to the value of $L_i$;

(i) combining the selected standard phonemes to form a phoneme string for an uttered word; and (j) comparing the formed phoneme string for an uttered word with stored phoneme strings for known words to determined which of the known words is the uttered word.

2. The method of claim 1 wherein the plural speakers are divided into plural groups each including multiple speakers, further including:
calculating the mean value of the LPC cepstrum coefficients for each phoneme of each group,
from the calculated mean values calculating the inverse matrix for each group,
calculating a weighting coefficient as $$a_{ij}^{(n)} = 2 \sum_{j=1}^{p} \delta^{ij} m_{ij}^{(n)}$$

for the $j^{th}$ order of each phoneme i of each group (n), where $\delta^{ij}$ is the value of element j, j' of inverse matrix $W^{-1}$ of covariance matrix W, calculating an average distance of each phoneme (i) of each group (n) as $$d_i^{(n)} = m_i^{(n)t} W^{-1(n)} m_i^{(n)}$$

storing the values of $a_{ij}^{(n)}$ and $d_i^{(n)}$ for each group, selecting one of the groups prior to the recognition mode by performing for each stored group a similarity calculation with a known uttered word in accordance with $$l_i^{(n)} = \sum_{j=1}^{p} a_{ij}^{(n)} C_j - d_i^{(n)}$$

determining a center frame of each phoneme of each uttered unknown word,
calculating the sum $L^{(n)}$ of center frame similarity $l_i^{(n)}$ for each phoneme of group n as $$L_{(n)} = \sum_{n=1}^{N} \sum_{i=1}^{K} l_i^{(n)}$$

where
K = number of stored phonemes
N = number of center frames in group n;
comparing the values of $L^{(n)}$ for the different groups to select the group to which the speaker of the unknown uttered word is a member,
during the recognition step comparing the LPC cepstrum coefficients of the speaker of the unknown uttered words only with the LPC cepstrum coefficients of the selected group.

3. The method of claim 2 wherein the center frame of each phoneme is selected from the frame in the center of each phoneme.

4. The method of claim 2 wherein the center frame of each phoneme is selected from the frame having the greatest similarity.

5. The method of claim 1 wherein the plural speakers are divided into plural groups each including multiple speakers, further including:
calculating the mean value of the LPC cepstrum coefficients for each phoneme of each group,
from the calculated mean values of all of groups n calculating a covariance matrix R common to all of the uttered known phonemes of the n groups,
deriving a weighting coefficient with respect to the $j^{th}$ order of the LPC cepstrum coefficients for each phoneme i of group n as $$a_{ij}^{(n)} = 2 \sum_{j=1}^{p} v_{jj'} m_{ij}^{(n)}$$

where $v_{jj'}$ is the value of element j, j' of inverse matrix $R^{-1}$ of covariance matrix R
deriving an average distance to phoneme i of group n as $$d_i^{(n)} = m_i^{(n)t} R^{-1} m_i^{(n)}$$

where t is a matrix transpose,
storing the values of $a_{ij}^{(n)}$ and $d_i^{(n)}$ for each of the n groups,
storing the values of $a_{ij}^{(n)}$ and $d_i^{(n)}$ for each group, selecting one of the groups prior to the recognition mode by performing for each stored group a similarity calculation with a known uttered word in accordance with $$l_i^{(n)} = \sum_{j=1}^{p} a_{ij}^{(n)} C_j - d_i^{(n)}$$

determining a center frame of each phoneme of each uttered unknown word,
calculating the sum $L^{(n)}$ of center frame similarity $l_i^{(n)}$ for each phoneme of group n as $$L^{(n)} = \sum_{i=1}^{N} l_i^{(n)}$$

where N = number of center frame in group n,
selecting the two groups having the largest value of L, whereby the groups r and s having the largest and next largest values of L respectively have values of $L^{(r)}$ and $L^{(s)}$,
deriving a numerical indication of the relative values of $L^{(r)}$ and $L^{(s)}$,
in response to the numerical indication having values in first and second ranges selecting groups r and s respectively,
during the recognition step comparing the LPC cepstrum coefficients of the speaker of the unknown uttered words only with the LPC cepstrum coefficients of the selected group.

6. The method of claim 5 wherein the numerical indication is derived as $R_e = L^{(r)} - L^{(s)}$,
selecting group r in response to $R_e$ being positive and in excess of a predetermined value,
selecting group s in response to $R_e$ being negative and in excess of the predetermined value,
selecting groups r and s for LPC cepstrum coefficient similarity in response to $R_e$ being less in absolute value than the threshold.

7. The method of claim 5 wherein a pair of the numerical indications are derived as $R_e^{(n)}$ and $R_e^{(s)}$, where $$R_e^{(r)} = \frac{L^{(r)}}{L^{(s)}} \text{ and } R_e^{(s)} = \frac{L^{(s)}}{L^{(r)}}$$

selecting group r in response to $R_e^{(n)}$ exceeding a predetermined threshold,
selecting group s in response to $R_e^{(s)}$ exceeding the predetermined threshold and
in response to neither $R_e^{(r)}$ nor $R_e^{(s)}$ exceeding the threshold determining which of $L^{(r)}$ or $L^{(s)}$ is greater, and
selecting the group (r or s) having the greater value of $L^{(r)}$ or $L^{(s)}$.

* * * * *